(12) United States Patent
Miyazaki et al.

(10) Patent No.: US 12,297,388 B2
(45) Date of Patent: May 13, 2025

(54) PHOTOCHROMIC HYDROXYURETHANE COMPOUND

(71) Applicant: TOKUYAMA CORPORATION, Shunan (JP)

(72) Inventors: Masayuki Miyazaki, Shunan (JP); Junji Takenaka, Shunan (JP); Junji Momoda, Shunan (JP); Katsuhiro Mori, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 506 days.

(21) Appl. No.: 17/768,770

(22) PCT Filed: Oct. 9, 2020

(86) PCT No.: PCT/JP2020/038344
§ 371 (c)(1),
(2) Date: Apr. 13, 2022

(87) PCT Pub. No.: WO2021/075383
PCT Pub. Date: Apr. 22, 2021

(65) Prior Publication Data
US 2023/0242809 A1    Aug. 3, 2023

(30) Foreign Application Priority Data

Oct. 17, 2019    (JP) .................. 2019-190111

(51) Int. Cl.
| | | |
|---|---|---|
| C09K 9/02 | (2006.01) | |
| C08G 77/48 | (2006.01) | |
| C09B 69/10 | (2006.01) | |
| C09D 5/29 | (2006.01) | |
| C09D 183/14 | (2006.01) | |
| G02C 7/10 | (2006.01) | |

(52) U.S. Cl.
CPC .............. *C09K 9/02* (2013.01); *C08G 77/485* (2013.01); *C09B 69/109* (2013.01); *C09D 5/29* (2013.01); *C09D 183/14* (2013.01); *C09K 2211/1425* (2013.01); *C09K 2211/145* (2013.01); *C09K 2211/1475* (2013.01); *G02C 7/102* (2013.01)

(58) Field of Classification Search
CPC ............... C09K 9/02; C09K 2211/145; C09K 2211/1425; C09K 2211/1475; C08G 77/485; C09B 69/109; C09D 5/29; C09D 183/14; G02C 7/102
See application file for complete search history.

(56) References Cited

U.S. PATENT DOCUMENTS

| | | | |
|---|---|---|---|
| 2006/0022176 A1 | 2/2006 | Wang et al. | |
| 2007/0145337 A1* | 6/2007 | Chopra | G03C 1/73 252/586 |
| 2012/0136148 A1* | 5/2012 | Lu | C09K 9/02 549/382 |
| 2012/0170098 A1 | 7/2012 | Takahashi et al. | |

FOREIGN PATENT DOCUMENTS

| | | | | |
|---|---|---|---|---|
| CN | 105348294 A | * | 2/2016 | ......... A61K 41/0042 |
| JP | 63-51492 A | | 3/1988 | |
| JP | 2-152981 A | | 6/1990 | |
| JP | 4-235993 A | | 8/1992 | |
| JP | 2008-507618 A | | 3/2008 | |
| JP | 2012-172144 A | | 9/2012 | |
| JP | 2013-212548 A | | 10/2013 | |
| JP | 2016-809 A | | 1/2016 | |
| JP | 2017-145278 A | | 8/2017 | |
| KR | 10-2012-0053988 A | | 5/2012 | |
| WO | WO 00/15630 A1 | | 3/2000 | |
| WO | WO 2004/041961 A1 | | 5/2004 | |

OTHER PUBLICATIONS

Supplementary European Search Report for corresponding European Application No. 20876755.8, dated Oct. 10, 2023.
International Search Report for PCT/JP2020/038344 mailed on Dec. 22, 2020.
Japanese Office Action for Japanese Application No. 2021-552371, dated Jul. 30, 2024, with a partial English translation.
English translation of the Korean Office Action for Korean Application No. 10-2022-7009423, dated Dec. 13, 2024.

* cited by examiner

*Primary Examiner* — Bijan Ahvazi
(74) *Attorney, Agent, or Firm* — Birch, Stewart, Kolasch & Birch, LLP

(57) ABSTRACT

A photochromic hydroxyurethane compound of the present invention is characterized in that, on condition of having at least one photochromic moiety as the photochromic minimal unit in a molecule, it has a hydroxyurethane constitutional unit represented by Formula (1):

—X—O—CO—NH—    (1)

In the formula, X is an oxygen-containing chain organic group having a hydroxyl group as a substituent, or a hydrogen atom in the hydroxyl group is substituted by any one of (A): a photochromic group having the photochromic moiety; (B): a polymerization reactive group having a polymerizable substituent; (C) an alkyl group having 1 to 10 carbon atoms; (D) a cycloalkyl group having 3 to 10 carbon atoms; or (E): an aryl group having 6 to 14 carbon atoms (each of the groups (C)-(E) can be bonded to an oxygen atom derived from the hydroxyl group via the oxygen-containing chain organic group).

14 Claims, No Drawings

PHOTOCHROMIC HYDROXYURETHANE COMPOUND

TECHNICAL FIELD

The present invention relates to a novel photochromic compound, and further relates to a photochromic curable composition comprising the photochromic compound and a photochromic cured body formed by use of the curable composition.

BACKGROUND ART

Photochromic compounds represented by chromene compounds, flugide compounds, spirooxazine compounds and the like possess photochromic properties that allow these compounds to quickly change color when irradiated with light containing ultraviolet rays such as sunlight or light of a mercury lamp, and to get back their original color when kept dark by stopping the irradiation. Due to the properties, these compounds have been used in various fields, particularly in the field of optical materials.

For instance, photochromic spectacle lenses molded from a plastic material blended with a photochromic compound are quickly colored to function as sunglasses outdoors irradiated with light such as sunlight containing ultraviolet rays, and they fade to function as transparent normal glasses indoors where there is no irradiation of such light. In recent years, there has been an increasing demand for the photochromic spectacle lenses.

In order to impart the photochromic properties to an optical material, usually, the photochromic compound is used in combination with a plastic material, and the following methods are known therefor.
- (a) A method of directly molding an optical material such as a lens by dissolving a photochromic compound in a compound and polymerizing. This method is called a kneading method.
- (b) A method of applying a resin layer in which a photochromic compound is dispersed on a surface of a plastic molded article such as a lens by coating or casting polymerization. This method is called a lamination method.
- (c) A method of joining two optical sheets by an adhesive layer formed of an adhesive resin in which a photochromic compound is dispersed. This method is called a binder method.

Some optical materials such as an optical article imparted with photochromic properties are further required to possess the following properties.
- (I) The degree of coloration (initial coloration) in the visible light range before irradiation with ultraviolet rays is low.
- (II) The degree of coloration (color optical density) when irradiated with ultraviolet rays is high.
- (III) The speed (fading rate) from stopping ultraviolet irradiation to return to the original state is high.
- (IV) Repeated durability of the reversible action of color development to fading is favorable.
- (V) The storage stability is high.
- (VI) It is easily molded to have various shapes.

Various photochromic compounds have been reported so far. However, it has been reported that even a photochromic compound having good photo-responsiveness in a liquid matrix has a tendency to exhibit poor photo-responsiveness and a long fading half-life in a solid matrix. The reason is considered as follows. That is, the structural change of the photochromic compound is restricted because the movable region is overwhelmingly small in the solid matrix compared with that in the liquid matrix.

As a method for solving this problem, various studies have been made on the molecular design of the photochromic compound itself.

For instance, Patent Documents 1 and 2 propose photochromic compounds (hereinafter, polymer photochromic compounds) having an oligomer chain group such as a polyalkylene oxy oligomer chain group or a polysiloxane oligomer chain group. It is presumed that such polymer photochromic compounds can be encapsulated in a solid matrix because the oligomer chain group covers the photochromic moieties. It is considered that when such photochromic moieties are encapsulated in a matrix, the matrix dependency is lowered, and thus, the moieties exhibit excellent photo-responsiveness even in a solid matrix.

The aforementioned polymer photochromic compound is of a technique that has attracted attention in recent years. However, even the polymer photochromic compounds of Patent Documents 1 and 2 need further improvement. Namely, according to the studies of the present inventors, it has been found that a cured body containing a polymer photochromic compound tends to have a white turbidity. Probably this turbidity is caused by aggregation of the polymer photochromic compounds during the curing process.

On the other hand, a low-molecular photochromic compound having no oligomer chain group is less aggregated in a solid matrix, and a relatively transparent photochromic cured body can be obtained. However, the low-molecular photochromic compound has high matrix dependency, which may cause problems in the speed for fading in a solid matrix, for instance. Further, due to high crystallinity, a chromene compound or the like may be difficult to dissolve in other polymerizable compounds (polymerizable monomer). Therefore, sometimes the chromene compound has difficulty in getting dissolved in a photochromic cured body at a high concentration. Sometimes, complicated operations are required for a high-level dispersion. There is room for improvement also in this respect.

PRIOR ART DOCUMENT

Patent Documents

[Patent Document 1] WO 2004/041961
[Patent Document 2] WO 2000/015630

SUMMARY OF THE INVENTION

Problem to be Solved by the Invention

It is an object of the present invention to provide a novel photochromic compound having high dispersion stability with respect to a solid matrix and reduced matrix dependency of photochromic properties.

It is another object of the present invention to provide a polymer photochromic compound that is easily dissolved in other polymerizable compounds and easily handled.

It is still another object of the present invention to provide a photochromic cured body comprising the aforementioned photochromic compound, and a photochromic curable composition from which the photochromic cured body can be obtained.

Means for Solving the Problems

In order to solve the aforementioned problems, the present inventors conducted intensive studies. The inventors examined the compounds of various structures so that, as for the polymer photochromic compound that exhibits the excellent photochromic properties in the solid matrix, the dispersion can be highly carried out in the matrix. In particular, the present inventors examined photochromic compounds having the structures that are compatible with the matrix (structures that can be finely dispersed in the matrix). The result shows that a compound having hydroxyurethane in molecules is useful for solving the problem. A specific example thereof is a photochromic compound having a hydroxyurethane bond (—X—O—CO—NH—; X is a group having a hydroxyl group) and at least a part of the hydroxyl group is substituted by a photochromic moiety. In other words, it has been found that a photochromic compound having a hydroxyurethane chain as a main chain and having a photochromic moiety in the chain maintains its photochromic properties in a solid matrix, while preventing or reducing aggregation during the curing process. Further, the compound is excellent in solubility in other polymerizable compounds. In this manner, the present invention has been achieved.

The present invention provides a photochromic hydroxyurethane compound comprising a hydroxyurethane constitutional unit represented by Formula (1) below, on the condition of having in a molecule at least one photochromic moiety as a photochromic minimum unit selected from the group consisting of a naphthopyran skeleton, a spirooxazine skeleton, a spiropyran skeleton, a flugide skeleton, a flugimide skeleton, and a diarylethene skeleton:

$$-X-O-CO-NH- \quad (1)$$

In the formula, X is an oxygen-containing chain organic group having a hydroxyl group as a substituent, or an oxygen-containing chain organic group in which a hydrogen atom of the hydroxyl group is substituted by any of groups (A) to (E) below:
(A) a photochromic group having the photochromic moiety,
(B) a polymerization reactive group having a polymerizable substituent,
(C) an alkyl group having 1 to 10 carbon atoms,
(D) a cycloalkyl group having 3 to 10 carbon atoms, and
(E) an aryl group having 6 to 14 carbon atoms.

Here, the groups (C) to (E) each is allowed to be bonded to an oxygen atom derived from a hydroxyl group via the oxygen-containing chain organic group. In other words, the groups (C) to (E) each having predetermined carbon atoms may be located at the terminal of the oxygen-containing chain organic group.

It is preferable that the photochromic hydroxyurethane compound of the present invention has the following structure.
(1) It comprises a plurality of the hydroxyurethane constitutional units, and the photochromic moieties are present at least in the hydroxyurethane constitutional units.
(2) It is represented by Formula (2) below:

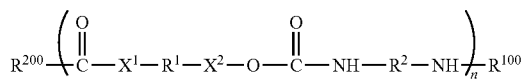

(2)

In the formula,
n is an integer from 1 to 100,
$R^{100}$ is a hydrogen atom, an alkyl group having 1 to 30 carbon atoms, an alkoxy group having 1 to 30 carbon atoms, or an aryl group having 6 to 14 carbon atoms,
$R^{200}$ is a hydroxyl group, an alkyl group having 1 to 30 carbon atoms, an alkoxy group having 1 to 30 carbon atoms, or an aryl group having 6 to 14 carbon atoms,
$-X^1-R^1-X^2-$ is a group corresponding to the group X in Formula (1), and
$X^1$ and $X^2$ each is a divalent group represented by any of Formulae (2a)-(2d) below.

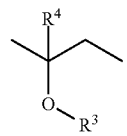

(2a)

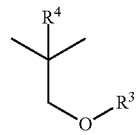

(2b)

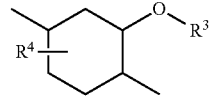

(2c)

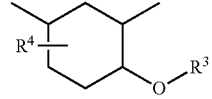

(2d)

In Formulae (2a)-(2d),
$R^3$ is a hydrogen atom or any of the groups (A) to (E), while at least one of the plural $R^3$ present in Formula (2) is a photochromic group,
$R^4$ is a hydrogen atom or an alkyl group having 1 to 10 carbon atoms, and
$R^1$ and $R^2$ each is a divalent group represented by Formula (3) below.

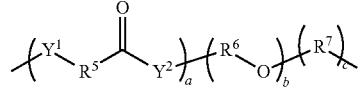

(3)

In Formula (3),
$R^5$ is an alkylene group having 1 to 30 carbon atoms, a cycloalkylene group having 3 to 30 carbon atoms, or an arylene group having 6 to 30 carbon atoms,
$R^6$ is an alkylene group having 1 to 30 carbon atoms, a cycloalkylene group having 3 to 30 carbon atoms, an arylene group having 6 to 30 carbon atoms, or a silylene group having any of groups below as a substituent, an alkyl group having 1 to 30 carbon atoms, an alkoxy group having 1 to 30 carbon atoms, or an aryl group having 6 to 30 carbon atoms,
$R^7$ is an alkylene group having 1 to 30 carbon atoms, a cycloalkylene group having 3 to 30 carbon atoms, or an arylene group having 6 to 30 carbon atoms,
$Y^1$ and $Y^2$ each is a direct bond, an oxygen atom, a sulfur atom, CO, SO, or NH, and a, b and c are integers from 0 to 100, provided that at least one of the a, the b and the c is other than zero.

(3) The photochromic moiety is an indeno[2,1-f]naphtho[1,2-b]pyran skeleton.

(4) The polymerizable substituent is at least one group selected from the group consisting of an acrylic group, a methacrylic group, an allyl group, a vinyl group, a 4-vinylphenyl group, an epoxy group, an episulfide group, a thiethanyl group, a carboxyl group, a hydroxyl group, a thiol group, an amino group, an isocyanate group, and a thiocyanate group.

(5) The photochromic group is represented by Formula (4) below:

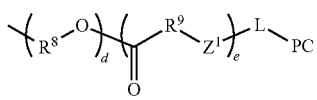

(4)

In the formula,
d and e are integers from 0 to 50,
PC is a group having a photochromic moiety,
$R^8$ is an alkylene group having 1 to 30 carbon atoms,
$R^9$ is an alkylene group having 1 to 30 carbon atoms, or an alkylene group having 1 to 30 carbon atoms and having an ether bond,
$Z^1$ is an oxygen atom, a sulfur atom, or NH, and
L is a divalent group having bonding hands one of which is bonded to the photochromic moiety, and represented by Formula (5) below.

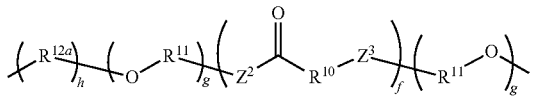

(5)

In the formula,
$R^{10}$ is an alkylene group having 1 to 30 carbon atoms, a cycloalkylene group having 3 to 12 carbon atoms, or an arylene group having 6 to 12 carbon atoms,
$R^{11}$ is an alkylene group having 1 to 20 carbon atoms, a cycloalkylene group having 3 to 12 carbon atoms, an arylene group having 6 to 12 carbon atoms, or a dialkylsilylene group having an alkyl group having 1 to 20 carbon atoms,
$R^{12a}$ is an alkylene group having 1 to 20 carbon atoms, a cycloalkylene group having 3 to 12 carbon atoms, or an arylene group having 6 to 12 carbon atoms,
$Z^2$ and $Z^3$ each is a direct bond, O, CO, or NH,
f and g are integers from 0 to 50, and
h is an integer of 0 or 1.

(6) The polymerization reactive group is represented by Formula (6) below.

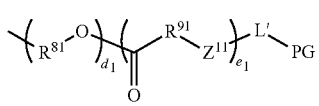

(6)

In the formula,
PG is a polymerizable substituent,
$d_1$ and $e_1$ are numbers from 0 to 50,
$R^{81}$ is an alkylene group having 1 to 30 carbon atoms,
$R^{91}$ is an alkylene group having 1 to 30 carbon atoms, or an alkylene group having 1 to 30 carbon atoms and having an ether bond,
$Z^{11}$ is an oxygen atom, a sulfur atom, or an NH group, and
L' is represented by Formula (7) below.

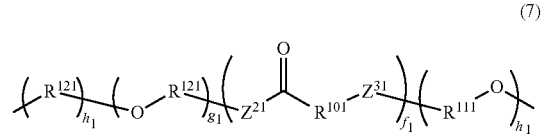

(7)

In the formula,
$R^{101}$ is a direct bonding hand, an alkylene group having 1 to 30 carbon atoms, a cycloalkylene group having 3 to 12 carbon atoms, or an arylene group having 6 to 12 carbon atoms,
$R^{111}$ is an alkylene group having 1 to 20 carbon atoms, a cycloalkylene group having 3 to 12 carbon atoms, an arylene group having 6 to 12 carbon atoms, or a dialkylsilylene group having an alkyl group having 1 to 20 carbon atoms,
$R^{121}$ is an alkylene group having 1 to 20 carbon atoms, a cycloalkylene group having 3 to 12 carbon atoms, or an arylene group having 6 to 12 carbon atoms,
$Z^{21}$ and $Z^{31}$ each is a direct bond, O, CO, or NH,
$f_1$ and $g_1$ are integers from 0 to 50, and,
$h_1$ is an integer of 0 or 1.

The present invention provides also a curable composition comprising the aforementioned photochromic hydroxyurethane compound and another polymerizable compound.

As curable composition in the present invention, the following (1) to (3) are preferred.

(1) The other polymerizable compound has as a polymerizable substituent at least one group selected from the group consisting of a carboxyl group, a hydroxyl group, a thiol group, an amino group, an isocyanate group, and a thiocyanate group.

(2) The other polymerizable compound has as a polymerizable substituent at least one radically polymerizable group selected from the group consisting of an acrylic group, a methacrylic group, an allyl group, a vinyl group, and a 4-vinylphenyl group.

(3) The other polymerizable compound is a compound having at least one polymerizable substituent selected from the group consisting of an epoxy group, an episulfide group, and a thietanyl group.

The present invention further provides: a photochromic cured body obtained by curing the aforementioned curable composition; a polymer molded article in which the aforementioned photochromic hydroxyurethane is dispersed; and an optical article coated with a polymer film in which the aforementioned photochromic hydroxyurethane is dispersed.

Effect of the Invention

The hydroxyurethane compound of the present invention has a hydroxyurethane structural unit represented by Formula (1) described above. The hydroxyurethane compound has a structural feature, namely, it has at least one photochromic moiety, which presents in the structural unit, or which is coupled to the structural unit. Because of the structure, the hydroxyurethane compound of the present invention exhibits excellent photochromic properties in a polymer matrix. Further, the hydroxyurethane compound rarely aggregates, so that when cured in a polymer matrix, white turbidity is effectively prevented or reduced, and thus, a transparent photochromic cured body can be obtained. In addition to that, the hydroxyurethane compound of the present invention can be easily dissolved in other polymerizable compounds.

MODE FOR CARRYING OUT THE INVENTION

<Photochromic Hydroxyurethane Compound>

The photochromic hydroxyurethane compound of the present invention has at least one photochromic moiety in the molecule and also has a hydroxyurethane constitutional unit.

1. Photochromic Moieties and Photochromic Group

The photochromic moiety of the hydroxyurethane compound of the present invention means a photochromic skeleton indicating a photochromic minimum unit, and the examples include a naphthopyran skeleton, a spirooxazine skeleton, a spiropyran skeleton, a flugide skeleton, a flugimide skeleton, and a diarylethene skeleton. Since the compound has at least one of the photochromic moieties in the molecules, it can exhibit its photochromic properties (reversible phototautomerism).

As the photochromic moieties in the present invention, an indenonaphthopyran skeleton, particularly an indeno[2,1-f]naphtho[1,2-b]pyran skeleton, is preferred among the various structures described above, from the viewpoint that excellent photochromic properties can be exhibited in color optical density and fading rate.

The aforementioned photochromic moieties are present in the molecules in the form of photochromic groups comprising substituents introduced into the respective basic skeletons. The photochromic groups have photochromic moieties (photochromic skeletons) and all of them are regarded as photochromic groups as long as the photochromic properties are exhibited. In the present invention, a photochromic basic structural group is a photochromic skeleton into which a certain substituent is introduced, and a photochromic group indicates this basic structural group or a group in the form in which a chain group described later is bonded to the basic structural group. This chain group will be introduced to incorporate the photochromic structural group into the molecules.

As described above, in the present invention, a naphthopyran skeleton, particularly an indeno[2,1-f]naphtho[1,2-b]pyran skeleton, is preferred as the photochromic moiety, and a photochromic basic structural group having such a basic skeleton is represented by Formula (8) below.

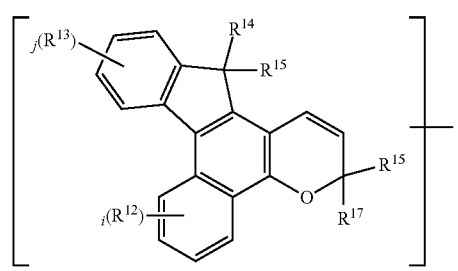

(8)

The photochromic basic structural group described above may be introduced directly as a photochromic group into the molecules, but preferably it is introduced into the hydroxyurethane constitutional unit or at a moiety other than the constitutional unit via a chain group described later.

In Formula (8), a structure from which groups $R^{12}$ to $R^{17}$ have been removed is a photochromic moiety, i.e., a photochromic basic skeleton.

In Formula (8), 'i' indicating the number of the group $R^{12}$ is an integer of 0 to 4, and 'j' indicating the number of the group $R^{13}$ is an integer of 0 to 4.

A plurality of $R^{12}$ and $R^{13}$ will be present when a plurality of 'i' or 'j' are present. The plural $R^{12}$ or $R^{13}$ may be the same groups or groups different from each other.

The $R^{12}$ and $R^{13}$ each denotes a bonding hand with which the photochromic basic structural group is bonded to another group (hereinafter this may simply be referred to as a direct bonding hand), or the following atoms or groups:

Hydrogen atom (i or j=0);
Hydroxyl group;
Alkyl group having 1 to 6 carbon atoms;
Cycloalkyl group having 3 to 8 carbon atoms;
Alkoxy group having 1 to 6 carbon atoms;
Amino group (a group comprising a primary or a secondary amine);
Heterocyclic group having a membered nitrogen atom and having a carbon atom bonded via the nitrogen atom;
Cyano group;
Nitro group;
Formyl group;
Hydroxycarbonyl group;
Alkylcarbonyl group having 2 to 7 carbon atoms;
Alkoxycarbonyl group having 2 to 7 carbon atoms;
Halogen atom;
Aralkyl group having 7 to 11 membered carbons;
Aralkoxy group having 7 to 11 membered carbons;
Aryloxy group having 6 to 12 carbon atoms;
Aryl group having 6 to 12 carbon atoms;
Alkylthio group having 1 to 6 carbon atoms;
Cycloalkylthio group having 3 to 8 carbon atoms; and
Arylthio group having 6 to 12 carbon atoms.

The above-described groups each can have such a substituent, as long as the substituent can be bonded to a substituent like a halogen atom and it does not inhibit the photochromic properties. The chain group such as an alkyl group may be linear or branched.

Unless otherwise specified, the group or the ring is not limited to these examples, but the group or the ring that can have a substituent not to inhibit the photochromic properties, may have such a substituent. Further, the chain group may be linear or may have branches.

Here, $R^{12}$ and $R^{13}$ each is independently present. Alternatively, two adjacent groups may form together an aliphatic ring (this may contain an oxygen atom, a nitrogen atom, or a sulfur atom).

$R^{14}$ and $R^{15}$ each denotes a direct bonding hand, or an atom or a group as shown below:
Hydrogen atom;
Hydroxyl group;
Alkyl group having 1 to 6 carbon atoms;
Cycloalkyl group having 3 to 8 carbon atoms;
Alkoxy group having 1 to 6 carbon atoms;
Alkoxyalkyl group having 1 to 6 carbon atoms;
Formyl group;
Hydroxycarbonyl group;
Alkylcarbonyl group having 2 to 7 carbon atoms;
Alkoxycarbonyl group having 2 to 7 carbon atoms;

Halogen atom;
Aralkyl group having 7 to 11 membered carbon atoms;
Aralkoxy group having 7 to 11 membered carbon atoms;
Aryloxy group having 6 to 12 carbon atoms; and
Aryl group having 6 to 12 carbon atoms.
$R^{14}$ and $R^{15}$ are independently present, but they can form together rings below, with the carbon atoms in the 13-position to be bonded:
An aliphatic ring having 3 to 20 carbon atoms;
A fused polycyclic ring comprising the aliphatic ring in which an aromatic ring or an aromatic heterocyclic ring is fused;
A heterocyclic ring having 3 to 20 membered atoms; and
A fused polycyclic ring comprising the heterocyclic ring in which an aromatic ring or an aromatic heterocyclic ring is fused.

$R^{16}$ and $R^{17}$ each is an aryl group having 6 to 20 carbon atoms or a heteroaryl group having 6 to 20 membered carbon atoms.

In Formula (8) described above, preferably, at least any one of $R^{12}$ to $R^{17}$ is an aryl group or a heteroaryl group, and a chain group for introducing the photochromic group into a hydroxyurethane constitutional unit or another moiety is bonded to the aryl group or the heteroaryl group.

In a case where the group indicated as any of $R^{12}$ to $R^{17}$ further has a substituent, the substituent is introduced to mainly control color development, color tones or the like. In a case where the carbon number is limited, examples of the substituent are as follows provided that the number is within the limit:
Alkyl group having 1 to 6 carbon atoms;
Alkoxy group having 1 to 6 carbon atoms;
Amino group (a group comprising a primary or secondary amine);
Heterocyclic group having a membered nitrogen atom and bonded to a carbon atom via the nitrogen atom;
Arylthio group having 6 to 12 carbon atoms;
Aryloxy group having 6 to 12 carbon atoms;
Aryl group having 6 to 12 carbon atoms; and
Alkylthio group having 1 to 6 carbon atoms.

As for the photochromic group represented by Formula (8) described above, $R^{12}$ to $R^{17}$ are preferably any of the following groups so as to exhibit excellent photochromic properties.

<Suitable $R^{12}$>
Alkyl group having 1 to 6 carbon atoms;
Alkoxy group having 1 to 6 carbon atoms;
Amino group (a group comprising a primary or secondary amine);
Heterocyclic group having a membered nitrogen atom and bonded to a carbon atom via the nitrogen atom;
Arylthio group having 6 to 12 carbon atoms;
Aryl group having 6 to 12 carbon atoms; and
Alkylthio group having 1 to 6 carbon atoms.

In particular, it is more preferred that the group described above is present in the 6-position and/or the 7-position.

It is most preferred that a suitable $R^{12}$ is present in each of the 6- and 7-positions of the indeno[2,1-f]naphtho[1,2-b]pyran, and that the two $R^{12}$ together form an aliphatic ring (which may contain an oxygen atom, a nitrogen atom, or a sulfur atom). It is particularly preferred that the number of atoms of this aliphatic ring (the number of atoms including heteroatoms and the number of carbon atoms to which the 6- and 7-positions are bonded) is 5 to 7. An alkyl group having 1 to 6 carbon atoms is suitable as the substituent that can be included in the aliphatic ring.

<Suitable $R^{13}$>
Alkyl group having 1 to 6 carbon atoms;
Alkoxy group having 1 to 6 carbon atoms; and
Hydrogen atom (when j=0).

<Suitable $R^{14}$ and $R^{15}$>
Alkyl group having 1 to 6 carbon atoms; and
Direct bonding hand.

In another suitable embodiment, $R^{14}$ and $R^{15}$ are bonded to each other and form rings as described below together with the carbon atoms in the 13-position to which the $R^{14}$ and $R^{15}$ are to be bonded:
Aliphatic ring having 3 to 20 carbon atoms;
A fused polycyclic ring in which an aromatic ring or an aromatic heterocyclic ring is fused to the aliphatic ring;
Heterocyclic ring having 3 to 20 membered atoms; and
A fused polycyclic ring in which an aromatic ring or an aromatic heterocyclic ring is fused to the heterocyclic ring.

Specific examples of the rings are as follows.
Suitable rings formed by $R^{14}$ and $R^{15}$:
Cyclopetane ring;
Cyclohexane ring;
Cycloheptane ring;
Cyclooctane ring;
Cyclononane ring;
Cyclodecane ring;
Cycloundecane ring;
Cyclododecane ring; and
Spirodicyclohexane ring.

Another suitable example is the spiro ring having as substituents one to ten alkyl groups having 1 to 6 carbon atoms or cycloalkyl groups having 5 to 7 carbon atoms. Still another suitable example is the spiro ring in which a cycloalkyl group having 5 to 7 carbon atoms is fused.

Further suitable examples among these rings are exemplified with the following formula.

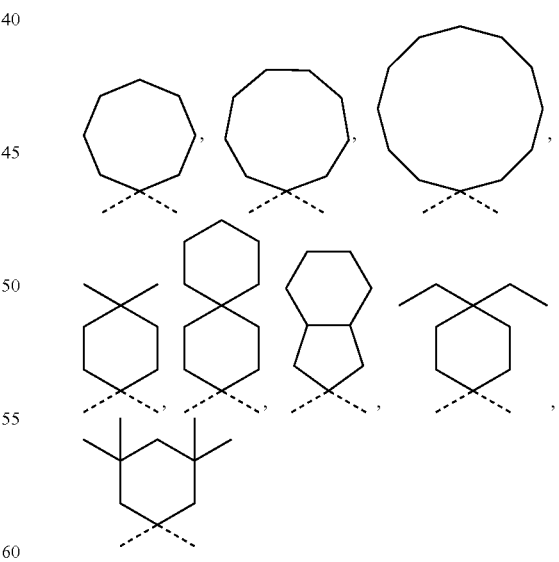

<Suitable $R^{16}$ and $R^{17}$>
Aryl group having 6 to 12 carbon atoms
Examples of suitable substituents that can be possessed by the aryl group are as follows:
Alkyl group having 1 to 6 carbon atoms;
Alkoxy group having 1 to 6 carbon atoms;

Dimethylamino group;

Diphenylamino group; and

Heterocyclic group having a membered nitrogen atom and bonded to a carbon atom via the nitrogen atom.

The photochromic basic structural group having an indeno[2,1-f]naphtho[1,2-b]pyran skeleton described above is known per se, and various types of groups are known in addition to the above examples. They are described, for instance in pumphlets of WO 1996/014596, WO 2001/019813, WO 2001/060811, WO 2005/028465, WO 2006/110221, WO 2007/073462, WO 2007/140071, WO 2008/054942, WO 2010/065393, WO 2011/10744, WO 2011/016582, WO 2011/025056, WO 2011/034202, WO 2011/078030, WO 2012/102409, WO 2012/102410, and WO 2012/121414. In the present invention, those having such basic structural groups can also be employed.

In the present invention, in particular, a chain group is bonded to the photochromic basic structural group of Formula (8) described above, which is present in the molecules as a photochromic group represented by Formula (4) below.

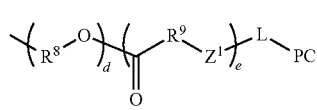

(4)

In Formula (4), PC is the aforementioned photochromic basic structural group, and this basic structural group is also a photochromic group. As can be understood from this Formula (4), the chained part containing $R^8$, $R^9$, $Z^1$ and L bonded to the PC is a chain group that introduces the basic structural group into the molecules.

$R^8$ is an alkylene group having 1 to 30 carbon atoms, and a representative example of substituent that can be possessed by the alkylene group is a halogen atom. A group preferred as the $R^8$ is an ethyl group, a propyl group, an isopropyl group, or a butyl group.

$R^9$ is an alkylene group having 1 to 30 carbon atoms or an alkylene group having 1 to 30 carbon atoms and having an ether bond. A group suitable for the $R^9$ is a butylene group, a pentylene group, or a hexylene group.

$Z^1$ is an oxygen atom, a sulfur atom, or a >NH group.

Here, d is an integer of 0 to 50, preferably 0 to 10, and particularly preferably 0 to 2.

And e is an integer of 0 to 50, preferably 0 to 10.

When d or e is 2 or more, a plurality of $R^8$, or $R^9$ and $Z^1$ are to be present. These may be the same or different from each other.

When d=e=0, this chain group consists of only L bonded to PC.

Here, L is a divalent group represented by Formula (5) below.

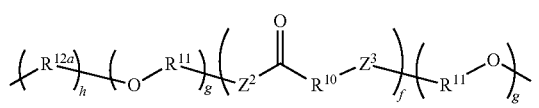

(5)

In Formula (5), f and g are integers of 0 to 50. Similarly in Formula (5), a plurality of $R^{10}$, $R^{11}$, $Z^2$ and $Z^3$ are to be present depending on the value of f or g. These groups may be the same or different from each other.

Here, h is an integer of 0 or 1.

As can be understood from Formula (5), when f=g=h=0, L becomes the direct bonding hand. Therefore, when f=g=h=0 and when d and e in Formula (4) are 0, this chain group does not exist but it becomes a direct bonding hand, and the photochromic group (basic structural group) will be directly bonded to another group.

In Formula (5), $R^{10}$ represents an alkylene group having 1 to 30 carbon atoms, a cycloalkylene group having 3 to 12 carbon atoms, or an arylene group having 6 to 12 carbon atoms.

A group preferred as the $R^{10}$ is an ethylene group, a propylene group, or a cyclohexylene group. An ethylene group is particularly preferred.

$R^{11}$ is: an alkylene group having 1 to 20 carbon atoms; a cycloalkylene group having 3 to 12 carbon atoms; an arylene group having 6 to 12 carbon atoms; or a dialkylsilylene group having an alkyl group having 1 to 20 carbon atoms.

Examples of the preferred groups as $R^{11}$ include an ethylene group, a propylene group, a butylene group, and a dimethylsilylene group. Among them, an ethylene group, a propylene group, or a dimethylsilylene group is particularly preferred.

$R^{12a}$ denotes an alkylene group having 1 to 20 carbon atoms, a cycloalkylene group having 3 to 12 carbon atoms, or an arylene group having 6 to 12 carbon atoms.

Examples of the group preferred as $R^{12a}$ include an ethylene group, a propylene group, a butylene group, a pentylene group, a hexylene group, a cyclohexene group, a phenylene group, and a naphthylene group.

$Z^2$ and $Z^3$ are each a direct bonding hand, O, CO or NH, and preferably, a direct bonding hand, O or CO.

Particularly preferred L represented by Formula (5) is represented by a formula below.

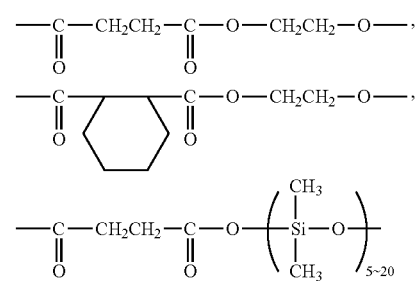

In view of the productivity of the hydroxyurethane compound and the effect of the encapsulation function (prevention of matrix dependency) by the oligomer chain, prevention of aggregation and the like, it is particularly preferable that the chain group in Formula (4) having the L is the group as described below.

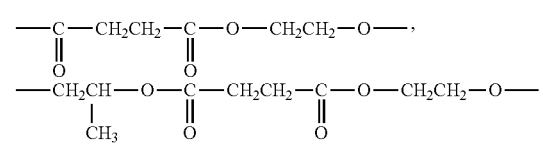

2. Hydroxyurethane Constitutional Unit

The hydroxyurethane compound of the present invention has a hydroxyurethane constitutional unit represented by Formula (1) below:

provided that the unit includes in a molecule at least one photochromic group (which may be a photochromic basic structural group) containing the aforementioned photochromic moiety.

In other words, the compound has a molecular structure where a photochromic group having the aforementioned photochromic moiety is introduced into the constitutional unit, or a molecular structure where a photochromic group is introduced into a part other than the constitutional unit. Namely, it is considered that the hydroxyurethane compound of the present invention is imparted with the photochromic properties, and in addition to that, the property of the hydroxyurethane constitutional unit represented by Formula (1) is reflected. As a result, the compatibility and the dispersibility in the solid matrix are improved, and white turbidity caused by aggregation in the matrix and a decrease of photochromic properties in the matrix are prevented or reduced. Since the photochromic hyrodoxyurethane compound is obtained in an oil form because its crystallinity is lowered, the solubility in other polymerizable compound is improved.

In Formula (1), X is an oxygen-containing chain organic group having a hydroxyl group as a substituent, and this oxygen-containing chain organic group (which is a group having an oxygen atom in a chain and may further contain a nitrogen atom, a sulfur atom, or the like) as an oligomer chain coats a photochromic moiety in a solid matrix (microencapsulation), thereby reducing matrix dependency and ensuring excellent photo-responsiveness.

As for the hydroxyl group of the oxygen-containing chain organic group, a hydrogen atom of the hydroxyl group may be a substituent. When this substituent is represented by R, the oxygen-containing chain organic group X has an —OH group or a group represented by —OR. The substituent R is any of the groups (A) to (E) below:

(A) a photochromic group having the photochromic moiety;
(B) a polymerization reactive group having a polymerizable substituent;
(C) an alkyl group having 1 to 10 carbon atoms;
(D) a cycloalkyl group having 3 to 10 carbon atoms; and
(E) an aryl group having 6 to 14 carbon atoms.

Substituent (A)

The substituent (A) is a photochromic group, and it has a photochromic moiety. This substituent is represented by the above-described Formula (4).

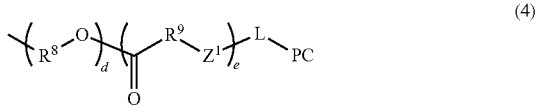

Polymerization Reactive Group (B)

The polymerization reactive group imparts polymerizability to the hydroxyurethane compound. By polymerizing and curing the compound alone or in combination with other polymerizable compounds described later, it is possible to obtain a photochromic cured body that can be immobilized on an obtained solid matrix and that has a further improved dispersibility in the solid matrix.

This polymerization reactive group has a polymerizable substituent, and it includes various types of polymerizable substituents to correspond to polymerization forms. In the present invention, at least one type of group can be selected as a polymerizable substituent from the group consisting of: an acrylic group, a methacrylic group, an allyl group, a vinyl group, a 4-vinylphenyl group, an epoxy group, an episulfide group, a thietanyl group, a carboxyl group, a hydroxyl group, a thiol group, an amino group, an isocyanate group, and a thiocyanate group.

These groups may be substituted alone with a hydrogen atom of the hydroxyl group. Alternatively, similarly to the aforementioned PC of the photochromic group, usually it has a chain linking group, and the aforementioned polymerizable substituent is present at the terminal of this chain group, from the viewpoint of polymerization reactivity.

The polymerization reactive group having the polymerizable substituent is represented by Formula (6) below.

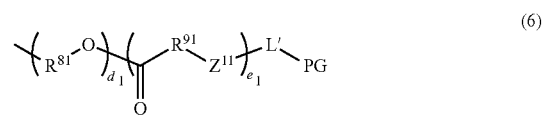

In this formula, PG is the aforementioned polymerizable substituent, and any of the groups listed above is suitable therefor.

Here, $d_1$ is an integer from 0 to 50, preferably from 0 to 10, and more preferably from 0 to 2.

As for $e_1$, this is an integer from 0 to 50, preferably from 0 to 10.

When $d_1$ and $e_1$ are 2 or more, the plurality of $R^{81}$, $R^{91}$ or $Z^{11}$ groups may be the same or different from each other. Further, when $d_1=e_1=0$, $L^1$ in Formula (6) will be directly bonded to the hydroxyl group (oxygen atom).

In Formula (6), $R^{81}$ is an alkylene group having 1 to 30 carbon atoms, and examples of preferable group include an ethylene group, a propylene group, an isopropylene group and a butylene group. Further, as the substituent that may be possessed by the alkylene group, a halogen atom is suitable.

$R^{91}$ is an alkylene group having 1 to 30 carbon atoms or an alkylene group having 1 to 30 carbon atoms and having an ether bond, and examples of the preferable group include a butylene group, a pentylene group, and a hexylene group. Further, as the substituent that may be possessed by the alkylene group, a halogen atom is suitable.

$Z^{11}$ is an oxygen atom, a sulfur atom, or an NH group.

Further, L' in Formula (6) is an oxygen-containing chain organic group represented by Formula (7) below.

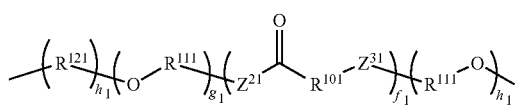

In Formula (7), $f_1$ and $g_1$ are integers from 0 to 50. When the $f_1$ and $g_1$ are 2 or more, there will be a plurality of $R^{101}$, $R^{111}$, $Z^{21}$ and $Z^{31}$, which can be the same or different from each other.

And, $h_1$ is an integer of 0 or 1.

When $f_1=g_1=h_1=0$, L' is a direct bonding hand, and the polymerizable substituent PG will be directly bonded to the group $Z^{11}$ in Formula (6). When $d_1=e_1=f_1=g_1=h_1=0$, the polymerizable substituent PG will be directly bonded to a hydroxyl group (oxygen atom).

In Formula (7), $R^{101}$ is a direct bonding hand, an alkylene group having 1 to 30 carbon atoms, a cycloalkylene group having 3 to 12 carbon atoms, or an arylene group having 6 to 12 carbon atoms. Examples of preferred group include a direct bonding hand, an ethylene group, a propylene group and a cyclohexylene group. Among them, a direct bonding hand and an ethylene group are particularly preferred. For the substituent that may be possessed by the alkylene group, a halogen atom is suitable.

$R^{111}$ is an alkylene group having 1 to 20 carbon atoms, a cycloalkylene group having 3 to 12 carbon atoms, an arylene group having 6 to 12 carbon atoms, or a dialkylsilylene group having an alkyl group having 1 to 20 carbon atoms. Examples of preferred group include an ethylene group, a propylene group, a butylene group and a dimethylsilylene group. Among them, an ethylene group, a propylene group and a dimethylsilylene group are particularly preferred.

$R^{121}$ is an alkylene group having 1 to 20 carbon atoms, a cycloalkylene group having 3 to 12 carbon atoms, or an arylene group having 6 to 12 carbon atoms. Examples of preferred group include an ethylene group, a propylene group, a butylene group, a pentylene group, a hexylene group, a cyclohexene group, a phenylene groups, and a naphthylene group.

$Z^{21}$ and $Z^{31}$ are each a direct bonding hand, O, CO, or NH, and preferably, a direct bonding hand, O, or CO.

The particularly preferred L' in Formula (6) is represented by the following formula.

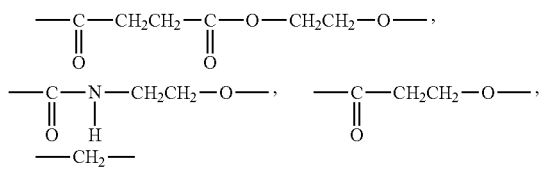

In the polymerization reactive group represented by Formula (6), as for the oxygen-containing chain group to which the polymerizable substituent PG is bonded, those shown below are particularly suitable from the viewpoint of productivity of the urethane hydroxyl compound, dispersibility in a solid matrix, and the like.

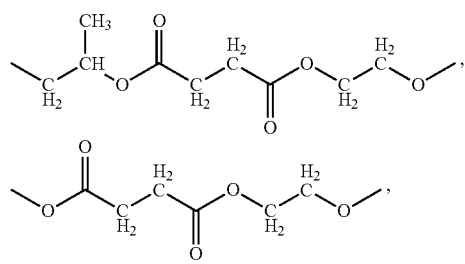

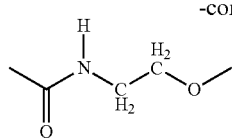

Alkyl Group (C), Cycloalkyl Group (D) and Aryl Group (E)

These groups, which are to be substituted by the hydrogen atom of the hydroxyl group possessed by the oxygen-containing chain organic group X, keep a movable region around the photochromic group and enhance the photochromic properties regarding the color optical density, the fading rate or the like, and also improve the solubility of this hydroxyurethane compound and improve the dispersibility and the curability in the solid matrix. In these groups, the number of carbon atoms is limited from the viewpoint of synthetic properties, photochromic properties, and the like.

For instance, the number of carbon atoms of the alkyl group is 1 to 10, and examples of the preferable group include a methyl group, an ethyl group, a propyl group, an isopropyl group, an n-butyl group, and a sec-butyl group.

The number of carbon atoms of the cycloalkyl group is 3 to 10, and examples of the preferable group include a cyclopentyl group, a cyclohexyl group, and a cycloheptyl group.

The number of carbon atoms of the aryl group is 6 to 14, and examples of suitable group include a phenyl group, a naphthyl group, an anthracenyl group, and a fluorenyl group.

These groups (C) to (E) may be bonded to an oxygen atom derived from a hydroxyl group via an oxygen-containing chain organic group similarly to the case of a polymerizable substituent. This oxygen-containing chain organic group is represented by, for instance, the aforementioned Formula (7).

<Suitable Hydroxyurethane Compound>

The photochromic hydroxyurethane compound of the present invention has at least one photochromic group containing the aforementioned photochromic moiety and also contains a hydroxyurethane constitutional unit represented by Formula (1) Preferably, a photochromic group is contained in at least a hydroxyurethane constitutional unit from the viewpoint of ease of synthesis, dispersibility in a polymer matrix, improved photochromic properties and the like.

A preferred hydroxyurethane compound in the present invention is represented by, for instance, the following Formula (2).

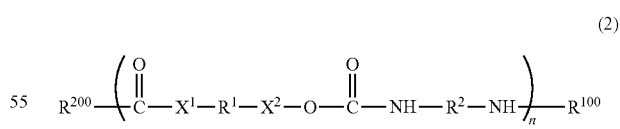

In Formula (2), n represents the number of repeating units, which is an integer of 1 to 100, and desirably an integer of 2 or more, from the viewpoint that the chain to which a photochromic moiety is bonded becomes long.

When n is more than one, a plurality of $X^1$, $X^2$, $R^1$ and $R^2$ are to be present in a molecule. These groups may be the same or different from each other.

In Formula (2), $R^{100}$ bonded to the NH is a hydrogen atom, an alkyl group having 1 to 30 carbon atoms, an alkoxy group having 1 to 30 carbon atoms, or an aryl group having 6 to 14 carbon atoms. Specific examples of suitable alkyl group having 1 to 30 carbon atoms include a methyl group, an ethyl group, a butyl groups, a hexyl group, an octyl group, a nonyl group, a decyl group, a 2-ethylhexyl group, a hexadecyl group, an octadecyl group, an eicosyl group, a tetracosyl group, and an oleyl group. Examples of suitable alkoxy group having 1 to 30 carbon atoms include a methoxy group, an ethoxy group, a propoxy group, a butoxy group, a hexyloxy group, and an octadecyloxy group. Examples of suitable aryl group having 6 to 14 carbon atoms include a phenyl group, a naphthyl group, a phenanthryl group, and an anthracenyl group.

$R^{200}$ bonded to CO is a hydroxyl group, an alkyl group having 1 to 30 carbon atoms, an alkoxy group having 1 to 30 carbon atoms, or an aryl group having 6 to 14 carbon atoms. Specific examples of suitable alkyl group having 1 to 30 carbon atoms include a methyl group, an ethyl group, a butyl group, a hexyl group, an octyl group, a nonyl group, a decyl group, a 2-ethylhexyl group, a hexadecyl group, an octadecyl group, an eicosyl group, a tetracosyl group, and an oleyl group. Examples of suitable alkoxy group having 1 to 30 carbon atoms include a methoxy group, an ethoxy group, a propoxy group, a butoxy group, a hexyloxy group, and an octadecyloxy group. Examples of suitable aryl group having 6 to 14 carbon atoms include a phenyl group, a naphthyl group, a phenanthryl group, and an anthracenyl group.

In Formula (2), $-X^1-R^1-X^2-$ is a group corresponding to the group X in Formula (1), and $X^1$ and $X^2$ are divalent groups represented by any of Formulae (2a) to (2d) below.

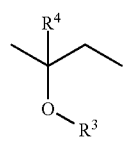

(2a)

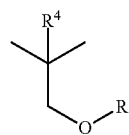

(2b)

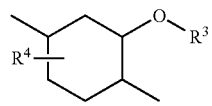

(2c)

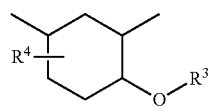

(2d)

In Formulae (2a) to (2d), $R^3$ is a hydrogen atom or a group of any of the above (A) to (E). At least one of the plurality of $R^3$ present in Formula (2) is a photochromic group of (A). That is, the hydroxyurethane constitutional unit necessarily contains a photochromic group. When the $R^3$ is a hydrogen atom or any of the group of (B) to (E), solubility of the hydroxyurethane compound can be further improved. Further, at the time of polymerization and curing in combination with any other polymerizable compound, polymerizability can be controlled, and a target photochromic cured body can be easily obtained. In addition, similarly to the case of the group of (B), the groups of (C) to (E) may also be bonded to an oxygen atom derived from a hydroxyl group via an oxygen-containing chain organic group as described above, and this oxygen-containing chain organic group is represented by Formula (7).

In the present invention, it is preferable that $X^1$ and $X^2$ are groups represented by Formula (2a) or (2b).

$R^4$ is a hydrogen atom or an alkyl group having 1 to 10 carbon atoms, and preferably, it is a hydrogen atom, a methyl group, or an ethyl group.

In Formula (2), $R^1$ and $R^2$ are each a divalent oxygen-containing chain group represented by Formula (3) below.

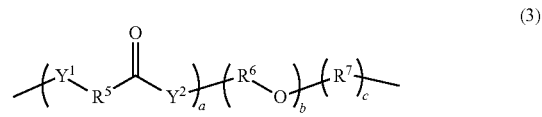

(3)

In Formula (3), a, b and c are integers from 0 to 100, provided that at least one of them represents a numerical value other than zero. When a, b, or c represents 2 or more, a plurality of $Y^1$, $R^5$, $Y^2$, $R^6$ or $R^7$ are to be present in the molecule, and these groups may be the same or different from each other.

In Formula (3), $R^5$ is an alkylene group having 1 to 30 carbon atoms, a cycloalkylene group having 3 to 30 carbon atoms, or an arylene group having 6 to 30 carbon atoms. Further, as the substituent that may be possessed by the alkylene group described above, a halogen atom is suitable.

$R^6$ is an alkylene group having 1 to 30 carbon atoms, a cycloalkylene group having 3 to 30 carbon atoms, an arylene group having 6 to 30 carbon atoms, or a silylene group having as a substituent any of the following groups.

Substituent possessed by the silylene group:
An alkyl group having 1 to 30 carbon atoms,
An alkoxy group having 1 to 30 carbon atoms, and
An aryl group having 6 to 30 carbon atoms.

Specific examples of suitable alkyl group having 1 to 30 carbon atoms, which are substituents, include: a methyl group, an ethyl group, a butyl group, a hexyl group, an octyl group, a nonyl group, a decyl group, a 2-ethylhexyl group, a hexadecyl group, and an octadecyl group. Among them, alkyl groups having 1 to 10 carbon atoms are preferred, and the specific examples include: a methyl group, an ethyl group, a propyl group, a butyl group, and a 2-ethylhexyl group. Examples of suitable alkoxy group having 1 to 30 carbon atoms, which are substituents, include: a methoxy group, an ethoxy group, a propoxy group, a butoxy group, a hexyloxy group, and an octadecyloxy group. Among them, an alkoxy group having 1 to 10 carbon atoms is preferred, and specific examples thereof include a methoxy group, an ethoxy group, and a propoxy group. An example of suitable aryl group having 6 to 30 carbon atoms, which is a substituent, is suitably an aryl group having 6 to 14 carbon atoms, and the specific examples include: a phenyl group, a naphthyl group, a phenanthryl group, and an anthracenyl group.

$R^7$ is an alkylene group having 1 to 30 carbon atoms, a cycloalkylene group having 3 to 30 carbon atoms, or an arylene group having 6 to 30 carbon atoms.

$Y^1$ and $Y^2$ are each a direct bonding hand, an oxygen atom, a sulfur atom, CO, SO or NH.

The hydroxyurethane compound represented by Formula (2) is particularly preferred to have the following structure so that it can exhibit further favorable photochromic properties while keeping its dispersibility in a solid matrix.

As for the group $R^1$ and the group $R^2$, at least one of them is preferably an alkylene group, a polyoxyalkylene group, or a polyoxysilylene group. Among these groups, an alkylene group having 1 to 30 carbon atoms; a polyoxyalkylene group having 1 to 30 carbon atoms; or a polyoxysilylene group having, as a substituent, at least one group selected from an alkyl group having 1 to 30 carbon atoms, an alkoxy group having 1 to 30 carbon atoms, or an aryl group having 6 to 30 carbon atoms, is further preferred. Further preferred examples include an alkylene group having 1 to 15 carbon atoms, a poly(oxyethylene) group having 2 to 200 carbon atoms, a poly(oxypropylene) group having 3 to 300 carbon atoms, and a poly(oxydimethylsilylene) group.

Among the hydroxyurethane compounds having the aforementioned structure, a photochromic group (a group represented by Formula (4)) having a photochromic moiety contained in $X^1$ and $X^2$ is present at the proportions as described below, so that particularly excellent effects can be exhibited.

The average values of the rate of hydrogen atoms and the like of the total $R^3$ (number %) in $X^1$ and $X^2$ are as follows.

The rate of hydrogen atoms is from 0 to 99%, particularly from 1 to 50%.

The rate of photochromic groups is from 1 to 100%, particularly from 50 to 99%.

The rate of polymerization reactive groups (groups of Formula (6)) is from 0 to 99%, particularly from 0 to 50%.

And, the rate of groups having other groups is from 0 to 50%.

It should be noted that when the rate of hydrogen atoms is 100%, it indicates that all of the group $R^3$ are —OH, and the total of the rates of the hydrogen atoms, the photochromic groups, the polymerization reactive groups, and the rate of other groups is 100%.

In the present invention, the weight average molecular weight (Mw) of hydroxyurethane (non-photochromic hydroxyurethane before introduction of the photochromic group) at a part excluding a photochromic group having a photochromic moiety (a group represented by Formula (4)) is not particularly limited.

However, if this molecular weight increases excessively, the solubility of the photochromic hydroxyurethane compound of the present invention tends to decrease, or the viscosity tends to be high to impair the handleability of the compound. On the other hand, if the molecular weight is too small, the photochromic properties tend to decrease. From the viewpoint, it is particularly preferred that the weight average molecular weight (Mw) of the aforementioned non-photochromic hydroxyurethane is in the range of 300 to 100000, particularly 500 to 50000, and further preferably 1000 to 30000.

It is preferable that, with respect to one photochromic group, the weight average molecular weight (Mw) of the non-photochromic hydroxyurethane is from 300 to 50000, particularly from 500 to 30000, and most preferably from 700 to 15000.

The weight average molecular weight or the like can be determined by the method described in the following Examples. That is, first, the weight average molecular weight (Mw) of the non-photochromic hydroxyurethane before introducing the photochromic group is measured by gel permeation chromatography (GPC), and then, the weight average molecular weight (Mw) is divided by the number of introduced photochromic groups, whereby the weight average molecular weight (Mw) of the non-photochromic hydroxyurethane per photochromic group can be determined.

<Production of Photochromic Hydroxyurethane Compound>

The photochromic hydroxyurethane compound of the present invention is produced by making hydroxyurethane having an OH group (non-photochromic hydroxyurethane) react with a photochromic compound having an OH reactive functional group (a photochromic compound material), where both the hydroxyurethane and the photochromic compound are synthesized separately in advance.

The OH reactive functional group is present at the terminal of the oxygen-containing chain organic group (the portion bonded to the group PC) in the photochromic group represented by Formula (4), and is preferably present at the terminal of the divalent group L represented by Formula (5).

When a chain portion having an OH reactive functional group is represented by Q for instance, this reaction can be simply represented by the following formula:

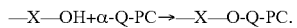

—X—OH+α-Q-PC→—X—O-Q-PC.

In the formula, X is an oxygen-containing chain organic group possessed by the non-photochromic hydroxyurethane, and a is a desorbed portion bonded to the Q (e.g., a hydrogen atom, a chlorine atom, or the like).

The group PC having a photochromic moiety may be allowed to directly react with the OH group. In this case, the chain group (or L) represented by Q is a direct bonding hand. When an OH reactive functional group is present at the terminal of L, the Q makes L.

The aforementioned reaction utilizes a reaction between OH and an OH reactive functional group, and various groups are known as the OH reactive functional groups. The examples include a carboxylic acid group, a carboxylic acid halide, an acid anhydride group, and an isocyanate group. In the present invention, any of these functional groups can be used to react with OH.

For instance, it is possible to introduce the aforementioned functional group into a group PC having a photochromic moiety by a known method, and then to make it react with an OH group possessed by hydroxyurethane.

In a case where the OH reactive functional group is a carboxylic acid group, the reaction with OH is an esterification reaction.

This esterification reaction can proceed in the presence of a mineral acid such as sulfuric acid or hydrochloric acid, an organic acid such as an aromatic sulfonic acid, or a Lewis acid such as boron fluoride ether. The esterification is carried out by stirring while heating if necessary in a solvent like toluene, and removing the generated water by azeotropy. Examples of the method of removing water in the esterification reaction include: use of a desiccant such as anhydrous magnesium sulfate or molecular sieves; and removal of water in the presence of a dehydrating agent represented by dicyclohexylcarbodiimide or the like.

Even when the OH reactive functional group is a carboxylic acid halide, the reaction with OH is also an esterification reaction. For this esterification reaction, it is possible to employ a method of removing hydrogen halide to be generated, by stirring in an ether-based solvent such as tetrahydrofuran in the presence of a base such as pyridine or dimethylaniline while heating if necessary.

In a case where the functional group is an acid anhydride group, the reaction is also an esterification reaction. In an example of the method that can be employed therefor, stirring is carried out while heating if necessary in a solvent such as toluene in the presence of a catalyst such as sodium acetate or pyridine.

In a case where the functional group is an NCO group, the reaction with OH is an urethanization reaction. In an example of method that can be employed therefor, stirring is carried out without a solvent or in a solvent like toluene in the presence of an amine-based catalyst such as triethylenediamine or a tin-based catalyst such as dibutyltin dilaurate while heating if necessary.

For a method of introducing a group having a polymerization reactive group and other groups, a method similar to the aforementioned methods can also be employed.

Production of Non-Photochromic Hydroxyurethane

A non-photochromic hydroxyurethane to react with a photochromic compound is produced by a reaction between a compound having at least one cyclic carbonate group in a molecule (hereinafter abbreviated as a cyclic carbonate compound) and a compound having at least one amino group in a molecule (hereinafter abbreviated as an amino compound).

The compound obtained by the reaction has an oxygen-containing chain organic group X containing a hydroxyl group as a substituent. For instance, all of the $R^3$ present in Formula (2) are hydrogen atoms.

This reaction can be carried out by heating and stirring in a solvent in the presence or absence of a catalyst.

There is no particular limitation on the solvent, but 1,4-dioxane, ethyl acetate, propylene glycol monomethyl ether acetate, dimethylformamide, dimethyl sulfoxide, N-methylpyrrolidone, acetonitrile, and the like can be used.

Examples of the catalyst include the following compounds.

Tertiary amines: triethylamine, tributylamine, DBU (diazabicycloundecene), DABCO (diazabicyclooctane), pyridine, and the like;

Alkali metal salts: lithium chloride, lithium bromide, lithium fluoride, sodium chloride, and the like;

Alkaline earth-metal salts: calcium chloride, and the like;

Quaternary ammonium salts: tetrabutylammonium chloride, tetraethylammonium bromide, tetraethylammonium iodide, benzyltrimethylammonium chloride, and the like;

Carbonates: potassium carbonate, sodium carbonate, and the like;

Metal acetate salts: zinc acetate, lead acetate, copper acetate, iron acetate and the like;

Metal hydrides: calcium hydride, and the like;

Metal oxides: calcium oxide, magnesium oxide, zinc oxide, and the like;

Phosphonium salts: tetrabutylphosphonium chloride, and the like;

Sulfonium salts: benzyl tetrahydrothiophenium chloride, and the like; and

Tin compounds: tetrabutyltin, dibutyltin dilaurate, dibutyltin diacetate, dibutyltin oxide, and the like.

The use amount of the catalyst is 0.01 to 0.5 mol, preferably 0.03 to 0.3 mol, and more preferably 0.05 to 0.2 mol per mol of the cyclic carbonate compound, from the viewpoint of effectively accelerating the reaction.

The reaction temperature is 30 to 150° C., preferably 40 to 120° C., and more preferably 50 to 100° C.

Although there is no particular limitation on the ratio in use amount of the cyclic carbonate compound to the amino compound, the amount of the amino compound is from 0.7 to 1.2 mol, preferably from 0.9 to 1.1 mol, more preferably from 0.95 to 1.05, and most preferably 1.00 per mol of the cyclic carbonate compound (the molar number of the cyclic carbonate group), from the viewpoint of effectively accelerating the reaction.

It is required that at least one cyclic carbonate group possessed by the cyclic carbonate compound and at least one amino group possessed by the amino compound are present in the molecules, and the number is preferably less than four, more preferably not more than two, and particularly preferably two, in consideration of the solubility of the non-photochromic hydroxyurethane, handleability, and the photochromic properties of the photochromic hydroxyurethane compound as the final target, for instance.

Cyclic Carbonate Compound

The carbonate compound having at least one cyclic carbonate group in the molecule is not particularly limited as long as it can react with an amino compound to form a hydroxyurethane structure, but a compound having a carbonate 5-membered ring is suitable in terms of reactivity with the amino compound. Such a compound having a 5-membered cyclic carbonate group can be produced through a reaction between an epoxy group-containing compound and the carbon dioxide in the presence of a catalyst at a temperature in the range of 40° C. to 150° C. and at the atmospheric pressure or a pressure slightly higher than the atmospheric pressure.

In the reaction, a solvent can be used if necessary.

Examples of the solvent include 1,4-dioxane, ethyl acetate, propylene glycol monomethyl ether acetate, dimethylformamide, dimethyl sulfoxide, N-methylpyrrolidone, and acetonitrile.

Examples of the catalyst for producing the cyclic carbonate compound include tetrabutylammonium bromide, tetrabutylammonium chloride, tetrabutylammonium iodide, benzyltrimethylammonium bromide, benzyltrimethylammonium chloride, lithium iodide, and lithium bromide.

The use amount of the catalyst is from 0.01 to 0.5 moles, particularly from 0.03 to 0.3 moles, and more preferably from 0.05 to 0.2 moles, per mole of the epoxy compound, from the viewpoint of effectively accelerating the reaction.

The cyclic carbonate compounds are classified into the following types, depending on the types of epoxy compound used in the reaction:

An aliphatic cyclic carbonate compound obtained by a reaction between an aliphatic epoxy compound and carbon dioxide;

An aromatic cyclic carbonate compound obtained by a reaction between an aromatic epoxy compound and carbon dioxide;

An alicyclic cyclic carbonate compound obtained by a reaction between an alicyclic epoxy compound and carbon dioxide;

A polyalkylene glycol-based cyclic carbonate compound obtained by a reaction between a polyalkylene glycol having an epoxy group and carbon dioxide;

A polysiloxane-based cyclic carbonate compound obtained by a reaction between a polysiloxane compound having an epoxy group and carbon dioxide;

A polyester polyether-based cyclic carbonate compound obtained by a reaction between polyester polyether having an epoxy group and carbon dioxide; and A polycyclic carbonate compound having three or more carbonate rings, obtained by a reaction between a polyepoxy compound and carbon dioxide.

With respect to the hydroxyurethane compound as a final target compound, suitable examples of the aforementioned cyclic carbonate compounds include an aliphatic cyclic carbonate compound, a polyalkylene glycol-based cyclic carbonate compound, a polysiloxane-based cyclic carbonate compound, and a polyester polyether-based cyclic carbonate compound, in consideration of the photochromic properties and dispersibility in a solid matrix.

Amino Compound

The amino compound to react with the cyclic carbonate compound is not particularly limited as long as it has a primary or secondary amino group and has reactivity with the cyclic carbonate compound. Particularly preferably, it is a compound having a primary amino group in consideration of reactivity with the cyclic carbonate compound.

Examples of the amino compound having a primary amino group include an aliphatic amino compound, an aromatic amino compound, an alicyclic amino compound, a polyalkylene glycol compound having an amino group, and a polysiloxane compound having an amino group. These amino compounds can have a secondary amino group or a tertiary amino group together with the primary amino group.

Among them, an aliphatic amino compound, a polyalkylene glycol-based amino compound, or a polysiloxane-based amino compound is preferred from the viewpoint of the photochromic properties of the hydroxyurethane compound as the final object and the dispersibility in the solid matrix.

<Photochromic Curable Composition>

The photochromic hydroxyurethane compound of the present invention produced by the aforementioned method can be cured alone to form a photochromic cured body. Alternatively, it can be blended with any other polymerizable compound and used as a photochromic curable composition.

Examples of the polymerizable compound include a urethane- or a urea-based polymerizable compound capable of forming a urethane bond, a urea bond, and the like, a radically polymerizable compound, and an epoxy-based polymerizable compound. Although these polymerizable compounds are not particularly limited, the polymerizable compound described in WO2018/235771 can be suitably used, for instance. Among them, polymerizable compounds described below are used particularly suitably.

Iso(thio)cyanate Compound

An iso(thio)cyanate compound is a compound having an isocyanate group or an isothiocyanate group, and it may contain both an isocyanate group and an isothiocyanate group. This compound is suitably used in combination with any of the following compounds containing active hydrogen.

Examples of the iso(thio)cyanate compounds are as follows, though the compounds are not limited to these examples:

Polyiso(thio)cyanate having at least two iso(thio)cyanate groups in one molecule;

Aromatic polyiso(thio)cyanate having an aromatic ring such as m-xylene diisocyanate or 4,4'-diphenylmethane diisocyanate; and Aliphatic polyiso(thio)cyanate such as norbornane diisocyanate or dicyclohexylmethane-4,4'-diisocyanate.

Compound Having Active Hydrogen

The compound having active hydrogen is preferably a compound having a hydroxyl group and/or a thiol group, and particularly preferably, a polyfunctional compound having two or more active hydrogens in one molecule, though the present invention is not limited thereto. Specific examples of the compound having active hydrogen include polyfunctional thiol compounds such as pentaerythritoltetrakis(3-mercaptopropionate) and 4-mercaptomethyl-3,6-dithia-octanedithiol, and polyfunctional alcohols such as trimethylolpropane and pentaerythritol.

Radically Polymerizable Compound

The radically polymerizable compound can be classified into a polyfunctional radically polymerizable compound and a monofunctional radically polymerizable compound, each of which can be used alone, or a plurality of the compounds can be used in combination. Examples of the radically polymerizable substituent include a group having an unsaturated double bond, that is, a vinyl group (including a styryl group, a (meth)acrylic group, an allyl group, and the like).

The polyfunctional radically polymerizable compound is a compound having two or more radically polymerizable substituents in a molecule. This polyfunctional radically polymerizable compound can be classified into a first polyfunctional radically polymerizable compound having 2 to 10 radically polymerizable substituents and a second polyfunctional radically polymerizable compound having more than 10 radically polymerizable substituents.

The first radically polymerizable compound is not particularly limited, but preferably it has 2 to 6 radically polymerizable substituents. Specific examples thereof are as follows.

Polyfunctional (meth)acrylic ester Compounds:
  Ethylene glycol di(meth)acrylate,
  Diethylene glycol di(meth)acrylate
  Triethylene glycol di(meth)acrylate
  Tetraethylene glycol di(meth)acrylate
  Ethylene glycol bisglycidyl(meth)acrylate
  Bisphenol A di(meth)acrylate
  2,2-Bis(4-(metha)acryloyloxyethoxyphenyl)propane, and
  2,2-Bis(3,5-dibromo-4-(meth)acryloyloxyethoxyphenyl)propane Polyfunctional Allylic Compounds:
  Diallyl phthalate
  Diallyl terephthalate
  Diallyl isophthalate
  Diallyl tartrate
  Diallyl epoxy succinate
  Diallyl fumarate
  Diallyl chlorendate
  Diallyl hexaphthalate
  Diallyl carbonate
  Allyl diglycol carbonate
  Trimethylolpropane triallyl carbonate Polyfunctional thio(meth)acrylic ester Compounds:
  1,2-Bis(methacryloylthio)ethanebis(2-acryloylthioethyl)ether
  1,4-Bis(methacryloylthiomethyl)benzenevinyl compounds: Divinylbenzene.

Examples of the second polyfunctional radically polymerizable compound having more than 10 radically polymerizable substituents include compounds having a relatively large molecular weight, such as a silsesquioxane compound having radically polymerizable substituents and a polyrotaxane compound having radically polymerizable substituents.

The monofunctional radically polymerizable compound is a compound having one radically polymerizable substituent in a molecule, and specific examples thereof include the following compounds, though the present invention is not limited thereto.

Unsaturated Carboxylic Acids:
  Acrylic acid
  Methacrylic acid
  Maleic anhydride (Meth)acrylic Acid Esters:
  Methyl(meth)acrylate
  Benzyl methacrylate Phenyl methacrylate
2-Hydroxyethyl methacrylate
Glycidyl (meth)acrylate
β-Methylglycidyl (meth)acrylate
Bisphenol A-monoglycidyl ether-methacrylate
4-Glycidyloxymethacrylate
3-(Glycidyl-2-oxyethoxy)-2-hydroxypropyl methacrylate
3-(Glycidyloxy-1-isopropyloxy)-2-hydroxypropylacrylate
3-(Glycidyloxy-2-hydroxypropyloxy)-2-hydroxypropylacrylate Fumaric Acid Esters:
  Diethyl fumarate
  Diphenyl fumarate
Thio(meth)acrylic Acids:
  Methylthioacrylate
  Benzylthioacrylate
  Benzylthiomethacrylate
Vinyl Compounds:
  Styrene
  Chlorostyrene
  Methylstyrene
  Vinylnaphthalene,
  α-Methylstyrene dimer
  Bromostyrene The radically polymerizable compound may be used alone, or a mixture of a plurality thereof may be used. In this case, the amount of polyfunctional radically polymerizable compound is preferably set to 80 to 100 parts by mass, and the monofunctional radically polymerizable compound is preferably set to 0 to 20 parts by mass relative to 100 parts by mass of the total radically polymerizable compounds. More preferably, the polyfunctional radically polymerizable compound is set to 90 to 100 parts by mass, and the monofunctional radically polymerizable compound is set to 0 to 10 parts by mass. Further, it is preferable to set the first polyfunctional radically polymerizable compound to 80 to 100 parts by mass, the second radically polymerizable compound to 0 to 20 parts by mass, and the monofunctional radically polymerizable compound to 0 to 20 parts by mass, relative to 100 parts by mass of the total radically polymerizable compounds. And it is further preferable to set the first polyfunctional radically polymerizable compound to 85 to 100 parts by mass, the second polyfunctional radically polymerizable compound to 0 to 10 parts by mass, and the monofunctional radically polymerizable compound to 0 to 10 parts by mass.

Compounding Agent

Various compound agents known per se may be blended in the curable composition containing the photochromic hydroxyurethane compound of the present invention, within a range not impairing the effect of the present invention, and the examples include a mold release agent, an ultraviolet absorber, an infrared absorber, an ultraviolet stabilizer, an antioxidant, a coloring inhibitor, an antistatic agent, a fluorescent dye, a dye, a pigment, and a perfume. A solvent or a leveling agent also may be blended. Furthermore, thiols such as t-dodecylmercaptan may be blended as a polymerization modifier, if necessary.

Among these agents, the ultraviolet stabilizer is suitable from the viewpoint that the durability of the photochromic moiety can be improved. As the ultraviolet stabilizer, a hindered amine light stabilizer, a hindered phenol antioxidant, a sulfur-based antioxidant and the like are known. Particularly suitable ultraviolet stabilizers are as follows:

Bis(1,2,2,6,6-pentamethyl-4-piperidyl) sebacate;
ADK STAB LA-52, LA-57, LA-62, LA-63, LA-67, LA-77, LA-82, LA-87 manufactured by ADEKA CORPORATION;
2,6-Di-tert-butyl-4-methyl-phenol;
Ethylenebis(oxyethylene)bis[3-(5-tert-butyl-4-hydroxy-m-tolyl)propionate]; and
IRGANOX® 1010, 1035, 1075, 1098, 1135, 1141, 1222, 1330, 1425, 1520, 259, 3114, 3790, 5057, and 565, manufactured by Ciba Specialty Chemicals.

Though the use amount of the ultraviolet stabilizer is not particularly limited as long as the effect of the present invention is not impaired, usually it is in the range of 0.001 to 10 parts by mass, particularly 0.01 to 1 parts by mass, relative to 100 parts by mass of the photochromic hydroxyurethane compound of the present invention. In particular in a case of using a hindered amine light stabilizer, the effect of improving durability may vary depending on the type of photochromic moiety, and as a result, a color deviation may occur in the adjusted color development and tone. In order to prevent or reduce the color deviation, it is preferable to set a blending amount of 0.5 to 30 mol, more preferably 1 to 20 mol, and still more preferably 2 to 15 mol per mol of the photochromic moiety.

Any photochromic compound other than the photochromic hydroxyurethane compound of the present invention can be blended within a range not impairing the effect of the present invention.

<Suitable Composition of Curable Composition>

In the curable composition in which the polymerizable compound or the like described above is to be blended, any of those having a polymerizable substituent and those having no polymerizable substituent can be used as the photochromic hydroxyurethane compound of the present invention.

In either case, in order to obtain a sufficient color optical density, the blending amount of the hydroxyurethane compound of the present invention is preferably set so that the mass corresponding to the photochromic moiety (photochromic skeleton) is 0.001 to 10 parts by mass when the total amount of the compounding agent other than the photochromic compound is set to 100 parts by mass.

A further suitable blending amount of the photochromic compound specified by the mass corresponding to the photochromic moiety varies depending on the method for exhibiting the photochromic properties. For instance, when the photochromic properties are exhibited by a kneading method, the amount of photochromic moieties ranges from 0.001 to 2 parts by mass, particularly from 0.001 to 1 part by mass. And when the photochromic properties are exhibited by a lamination method or a binder method, the amount of photochromic moieties ranges from 0.1 to 10 parts by mass, particularly from 1 to 7 parts by mass.

The blending ratio of the hydroxyurethane compound of the present invention to the other polymerizable compound varies also depending on how many groups having a photochromic moiety (photochromic skeleton) are contained in one molecule of the hydroxyurethane compound to be used.

For instance, when the blending amount is determined based on the two compounds of the hydroxyurethane compound and another polymerizable compound, in a case where the average number of groups having a photochromic moiety contained in one molecule is 1 to 30, preferably the hydroxyurethane compound is blended in a proportion of 0.5 to 80% by mass and the total amount of the other polymerizable compounds is in a proportion of 20 to 99.5% by mass. In a case where the average number of groups having a photochromic moiety contained in one molecule is 30 to 300, preferably the hydroxyurethane compound is blended in a proportion of 0.1 to 50% by mass and the total amount of the other polymerizable compounds is in a proportion of 50 to 99.9% by mass.

In the present invention, it is further suitable to select the type or the like of the polymerizable compound to be used in combination in the molecular structure of this hydroxyurethane compound in order to maximally exhibit the effect of improving the photochromic properties imparted by the photochromic hydroxyurethane compound.

For instance, in a case where the polymerizable substituent introduced into the hydroxyurethane compound is an acrylic group and/or a methacrylic group, a radically polymerizable compound is preferably selected as the other polymerizable compound.

In a case where the polymerizable substituent introduced into the hydroxyurethane compound is an OH group, it is preferable to use polyol, polythiol, polyamine, polyisocyanate and polyisothiacyanate in combination so that a urethane bond, a thiourethane bond, a urea bond or a thiourea bond (particularly a urethane bond or a thiourethane bond) is formed.

<Use of Curable Composition>

In a case where a group having a polymerizable substituent is introduced into the photochromic hydroxyurethane compound of the present invention, this hydroxyurethane compound can be used alone not in combination with any other polymerizable compound.

For instance, a photochromic sheet (photochromic cured body) can be produced by sheet molding using a curable composition in which other polymerizable compounds are not blended. Further, this curable composition is dispersed or dissolved in an organic solvent to prepare a coating liquid, and this coating liquid is applied to a transparent optical sheet or optical film and dried, whereby a photochromic coating layer (photochromic cured body) is formed. In this manner, photochromic properties can be exhibited.

Meanwhile, it is usually preferable that the curable composition of the present invention is blended with a polymerizable compound or any other compounding agent in addition to a photochromic hydroxyurethane compound. For instance, it is desirable to prepare a photochromic curable composition by melt-kneading the respective components, and to polymerize and cure this to form a photochromic cured body, and to exhibit the photochromic properties of this cured body.

The following description refers to an example in which a curable composition containing a polymerizable compound is used as a photochromic cured body. In a case of using only a photochromic hydroxyurethane compound into which a group having a polymerizable substituent is introduced, the same method of curing the curable composition can be employed. Further, the photochromic hydroxyurethane compound contained in the curable composition may or may not have a polymerizable substituent.

Polymerization curing for producing a photochromic cured body is performed by radical polymerization, ring-opening polymerization, anionic polymerization or condensation/polymerization by irradiation with active energy rays such as ultraviolet rays, α rays, β rays or γ rays, by heating or a combination thereof, for instance. In other words, an appropriate polymerization means may be employed depending on the type of the polymerizable compound or the polymerization curing accelerator and the form of the photochromic cured body to be formed.

At the time of thermally polymerizing the curable composition of the present invention in which the polymerizable compound or the like is blended, the polymerization temperature particularly affects the properties of the photochromic cured body to be obtained. Although this temperature condition cannot be generally limited as it is under influence of the type and amount of the thermal polymerization initiator and the type of the polymerizable compound, usually a method of starting polymerization at a relatively low temperature and slowly rising the temperature is suitable.

As for the polymerization time, it is also suitable to determine the optimal time according to various factors as well as the temperature. It is usually preferable to select a condition so that the polymerization is completed in 2 to 48 hours. In particular, in a case of obtaining a photochromic laminated sheet, it is preferable to determine an optimal temperature and time so as to polymerize at a temperature at which the reaction of the polymerizable functional groups proceeds, and at that time, to have a target molecular weight.

In the photopolymerization of the curable composition of the present invention, the UV intensity as one of the polymerization conditions particularly affects the properties of the photochromic cured body to be obtained. Though this illumination condition cannot be generally limited because it is under influence of the type and amount of the photopolymerization initiator and the type of the polymerizable monomer, it is usually preferable to select a condition so that UV light of 50 to 500 mW/cm$^2$ is irradiated at a wavelength of 365 nm for 0.5 to 5 minutes.

In a case of exhibiting the photochromic properties by a kneading method where the above-described polymerization curing is used, the aforementioned curable composition is injected between glass molds held by an elastomer gasket or a spacer, and a photochromic cured body molded into a form of an optical material such as a lens can be obtained by casting polymerization with heat in an air furnace or by irradiation with active energy rays such as ultraviolet rays depending on the type of the polymerizable compound or the polymerization curing accelerator.

According to this method, an eyeglass lens or the like, which is directly imparted with photochromic properties, can be obtained.

In a case of exhibiting the photochromic properties by a lamination method, a curable composition is appropriately dissolved in an organic solvent to prepare a coating liquid, and the coating liquid is applied to a surface of an optical base material such as a lens base material by spin coating, dipping, or the like, dried to remove the organic solvent, and then, UV-irradiated or heated in an inert gas such as nitrogen or the like to perform polymerization curing. In this manner, a photochromic layer made of a photochromic cured body is formed on the surface of the optical base material (coating method).

It is also possible to form a photochromic layer of a photochromic cured body on the surface of the optical base material by casting polymerization using an inner mold (casting polymerization method). In the formation, an optical base material like a lens base material is disposed facing the glass mold so as to form a predetermined void, a curable composition is injected into the void, and polymerization curing is performed by UV irradiation, heating or the like.

In a case of forming the photochromic layer on the surface of the optical base material by the lamination method (coating method and casting polymerization method) as described above, it is also possible to enhance the adhesion between the photochromic layer and the optical base material by subjecting in advance the surface of the optical base material to a chemical treatment with an alkaline solution, an acid solution, or the like, or a physical treatment by corona discharge, plasma discharge, polishing or the like. Needless to note, it is also possible to provide a transparent adhesive resin layer on the surface of the optical base material.

In a case of exhibiting photochromic properties by the binder method, a photochromic sheet is prepared by sheet formation using a curable composition. This sheet is sandwiched between two transparent sheets (optical sheets) and subjected to the polymerization curing as described above, whereby a photochromic laminate having a photochromic layer as an adhesive layer is obtained.

In this case, for production of the photochromic sheet, it is also possible to employ a coating process using a coating liquid containing a curable composition dissolved in an organic solvent.

The thus produced photochromic laminate is mounted in a mold, for instance, and thereafter, a thermoplastic resin for an optical base material like a lens (such as polycarbonate) is injection molded, whereby an optical base material like a lens having a predetermined shape imparted with photochromic properties is obtained. This photochromic laminate can be made adhere to the surface of the optical base material by an adhesive or the like, so that a photochromic lens can be obtained.

In a case of producing a photochromic laminate in the aforementioned manner, it is preferable that urethane- or a urea-based polymerizable compound is used as the polymerizable compound, since it has a particularly high adhesion to the optical base material. Particularly preferably, a urethane-based polymerizable compound is used, which is adjusted to form polyurethane.

The aforementioned curable composition of the present invention exhibits excellent photochromic properties in color optical density, fading rate and the like, and it is effectively utilized for producing an optical base material imparted with photochromic properties, a photochromic lens for instance, without impairing other properties such as mechanical strength.

The photochromic layer or the photochromic cured body formed of the curable composition of the present invention may be subjected to any post-treatment, depending on its application. Examples of the post-treatment include: dyeing with dyestuff such as a dispersive dye; formation of a hard coat film by use of a silane coupling agent or a hard coat agent based on a sol of silicon, zirconium, antimony, aluminum, tin, or tungsten; formation of a thin film by vapor deposition of a metal oxide such as $SiO_2$, $TiO_2$, or $ZrO_2$; an antireflection treatment by use of a thin film coating of an organic polymer; and an antistatic treatment.

EXAMPLES

The present invention will be described with reference to the following Examples.

Molecular weight measurement of the compounds in the Examples was performed as follows.
(Molecular Weight Measurement)

The molecular weight was determined as the weight average molecular weight by gel permeation chromatography (GPC) using a liquid chromatographic apparatus (manufactured by Nihon Waters K.K.) by comparative conversion with that of polyethylene under the following conditions. A differential refractometer was used for the detector.
Columns:
KF-series of Shodex® GPC manufactured by Showa Denko K.K. was used in accordance with the molecular weight of the sample to be analyzed.
KF-802 (exclusion limit molecular weight: 5,000)
KF-802.5 (exclusion limit molecular weight: 20,000)
KF-803 (exclusion limit molecular weight: 70,000)
KF-804 (exclusion limit molecular weight: 400,000)
KF-805 (exclusion limit molecular weight: 2,000,000)
Developing solution: dimethylformamide (DMF)
Flow rate: 1 ml/min
Temperature: 40° C.
Standard sample: polyethylene Example 1

First Step for Synthesis of Photochromic Hydroxyurethane Compound (PHU1D1)
Synthesis of Polysiloxane-Type 5-Membered Cyclic Carbonate An epoxy compound represented by Formula (9) below (average weight molecular weight: 1996) was prepared.

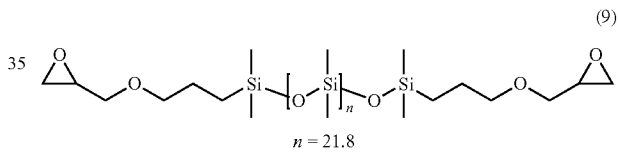

$n = 21.8$ (9)

A mixture of 10 g (5.0 mmol) of the aforementioned epoxy compound, 0.24 g (0.7 mmol) of tetrabutylammonium bromide and 25 mL of N-methylpyrrolidone was prepared and heated at 100° C. in a carbon dioxide atmosphere for 56 hours.

The reaction was followed by $^1$H-NMR and cooled to room temperature after confirming that the epoxy compound of the material had been consumed. Next, 50 mL of water and 100 mL of toluene were added to perform separation. The separation was repeated so as to be conducted three times in total, and the solvent of the obtained organic layer was concentrated to obtain 9.9 g (yield: 96.5%) of polydimethylpolysiloxane type cyclic carbonate as a pale yellow oil represented by Formula (10) below.

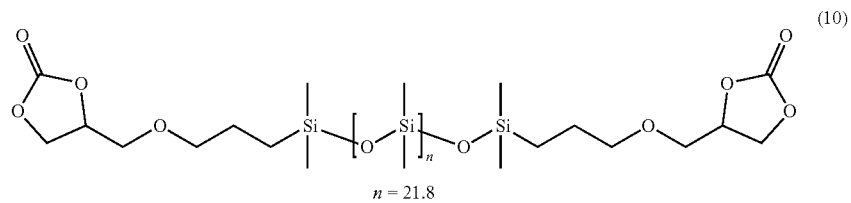

$n = 21.8$ (10)

Second Step
(Synthesis of Hydroxyurethane Compound (PHU1))

In this step, 4.2 g (2.0 mmol) of cyclic carbonate obtained in the first step, 0.4 g (2.0 mmol) of dodecamethylenediamine, 0.06 g (0.2 mmol) of tetrabutylammonium bromide and 2 mL of propylene glycol methyl ether acetate were mixed. After a reaction at 100° C. for 24 hours in the nitrogen atmosphere, the mixture was cooled to room temperature. Next, 50 mL of water and 100 mL of toluene were added to perform a separation. The separation was repeated twice, and the solvent of the obtained organic layer was concentrated to obtain 3.9 g of hydroxyurethane as a yellow oil (PHU1) represented by the following formula.

This hydroxyurethane (PHU1) has a polydimethylsilicone chain. It is non-photochromic as no photochromic group is introduced therein.

The generation ratio between the hydroxyl group directly bonded to the main chain of the chain group and the hydroxyl group bonded to the side chain extending from the straight chain is randomly determined.

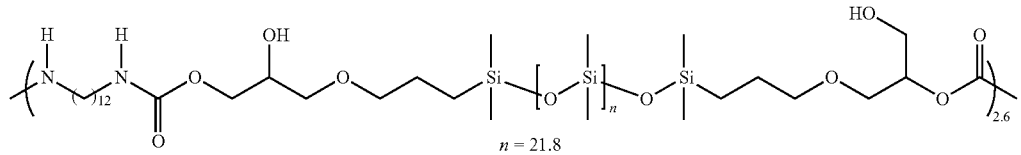

The obtained PHU1 was analyzed by GPC. The weight average molecular weight Mw (GPC) was 6000 (repeating number: 2.6).

The obtained PHU1 was analyzed also by FT-IR to confirm occurrence of C=O stretching vibration (1703 $cm^{-1}$) derived from urethane bond and occurrence of NH stretching vibration (3373 $cm^{-1}$).

Third Step
(Synthesis of Compound Having Photochromic Moieties)

A compound represented by Formula (11) below and a compound represented by Formula (12) below were prepared.

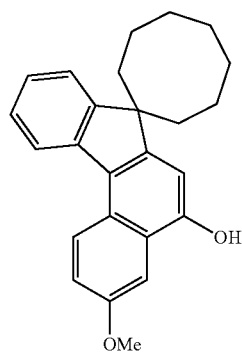

(11)

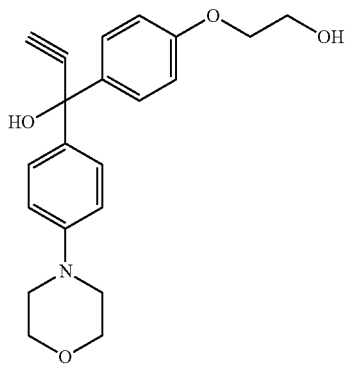

(12)

In this step, 1.8 g (5.0 mmol) of the compound represented by Formula (11), 2.7 g (7.6 mmol) of the compound represented by Formula (12), 0.13 g (0.5 mmol) of p-toluenesulfonic acid pyridinium salt and 50 mL of toluene were mixed, and the mixture was heated and stirred at 75° C. for 2 hours. After cooling to room temperature, the mixture was washed three times with 50 mL of water, and the organic layer was distilled off under reduced pressure. The obtained residue was purified by silica gel column chromatography to obtain 2.4 g of a photochromic compound represented by Formula (13) below. The yield was 70%.

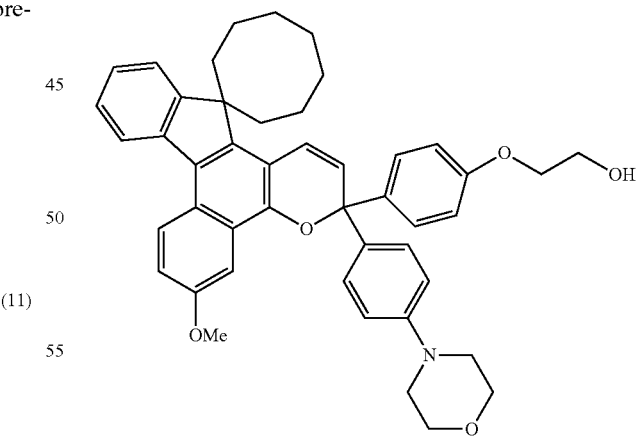

(13)

To the thus obtained photochromic compound of Formula (13), 0.5 g (5.0 mmol) of succinic anhydride, 0.6 g (6.0 mmol) of triethylamine and 25 mL of dichloromethane were added and stirred at room temperature for 12 hours. After the reaction, the dichloromethane was distilled off under reduced pressure, and the obtained residue was purified by silica gel chromatography to obtain 2.5 g (3.2 mmol) of a photochromic compound that has a carboxyl group introduced at its terminal and is represented by Formula (14) below. The yield was 90%.

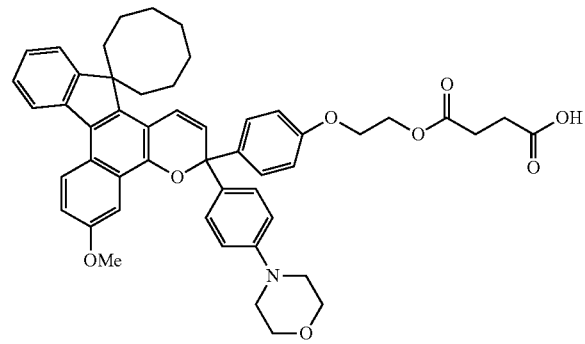

(14)

Fourth Step
(Synthesis of Photochromic Hydroxyurethane (PHU1D1))

In this step, 0.6 g (0.1 mmol) of PHU1 obtained in the second step, 0.16 g (0.2 mmol) of a photochromic compound with a terminal carboxyl group of Formula (14) obtained in the third step, and 10 ml of dichloromethane were mixed and stirred. To the stirred mixture, 192 mg of WSC (water-soluble carbodiimide) and 63 mg of DMAP (dimethylaminopyridine) were added and stirred while shielding light for 12 hours. After confirming by TLC (Thin Layer Chromatography) that no materials remaining, water was added to stop the reaction. After extraction with toluene, the mixture was concentrated on an evaporator and purified by silica gel chromatography to obtain 0.5 g of photochromic hydroxyurethane (PHU1D1) having a photochromic group represented by Formula (15) below. The yield was 65%.

The dashed line in Formula (15) indicates a hand for bonding to hydroxyurethane (PHU1).

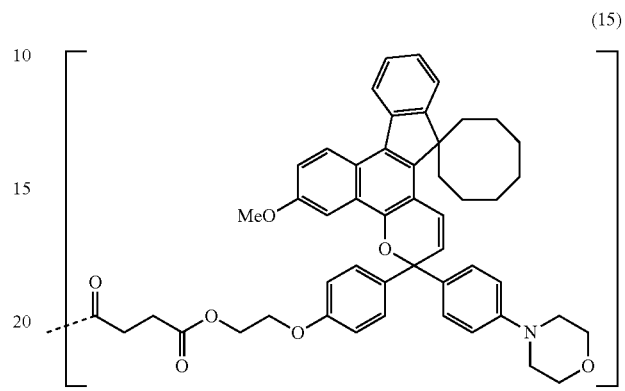

(15)

With respect to the compound obtained in the aforementioned manner, it was confirmed from $^1$H-NMR that the number of photochromic moieties (photochromic basic skeleton) contained per repeating unit of PHU1 (hydroxyurethane) was about 2.0 (about 5.2 per molecule as a whole). The number of photochromic moieties corresponds to the number in Formula (15).

The structural formula of the obtained photochromic hydroxyurethane (PHU1D1) is as follows. Numerical values in the formula are average values.

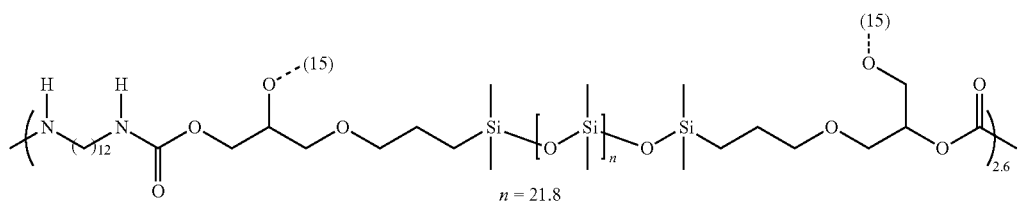

The following formula indicates a comparison between the aforementioned structural formula and the respective groups in Formula (2).

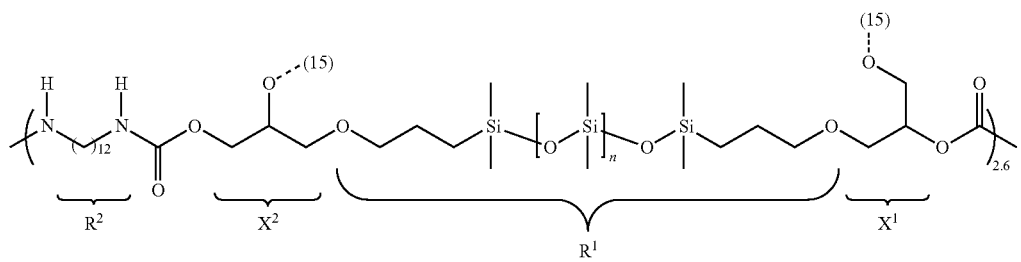

Analysis of the Group $R^3$
- Rate of hydrogen atoms: 0%
- Rate of photochromic moieties: 100%
- Rate of polymerization reactive groups: 0%
- Rate of other groups: 0%

The weight average molecular weight (Mw) of the hydroxyurethane moiety per photochromic group was 1154.

Example 2

Synthesis of Photochromic Hydroxyurethane (PHU1D2)

In the fourth step of Example 1, the use amount of PHU1 (non-photochromic hydroxyurethane having a polydimethylsilicone chain) obtained in the second step was changed to 1.2 g (0.2 mmol), and the use amount of the photochromic compound with the terminal carboxyl group of Formula (14) was changed to 0.26 g (0.32 mmol). Excepting these modifications, operations similar to those in Example 1 were performed to obtain 0.88 g (yield: 60%) of the photochromic hydroxyurethane compound (PHU1D2).

It was confirmed from $^1$H-NMR that the number of photochromic moieties (photochromic basic skeleton) contained per repeating unit of PHU1 (hydroxyurethane) was about 1.57 (about 4.1 per molecule as a whole).

The molecular structure of the obtained photochromic hydroxyurethane compound (PHU1D2) was analyzed in the same manner as in Example 1. The results are as follows (the following numerical values indicate the average values).

Analysis of the Group $R^3$
- Rate of hydrogen atoms: 21.5%
- Rate of photochromic moieties: 78.5%
- Rate of polymerization reactive groups: 0%
- Rate of other groups: 0%

Example 3

Preparation and Evaluation of Photochromic Cured Body (Molded Body)

A curable composition was prepared using the photochromic hydroxyurethane compound (PHU1D1) obtained in Example 1, and this curable composition was used for producing a photochromic cured body for the purpose of evaluation on its photochromic properties.

Preparation of Curable Composition

The respective components were mixed thoroughly according to the formulation below for preparing a polymerizable composition.

Norbornene methane diisocyanate: 46.0 parts by mass
Pentaerythritoltetrakis(3-mercaptopropionate): 54.0 parts by mass The total of these polymerizable compounds was set to 100 parts by mass. The following additives were each blended with respect to a total of 100 parts by mass of these polymerizable compounds.

Dimethyldichlorotin: 0.04 parts by mass
Phosphate-based mold release agent (JP-506H manufactured by Johoku Chemical Co., Ltd.): 0.1 part by mass Further, the photochromic curable composition was prepared by kneading the PHU1D1 obtained in Example 1 to ensure that the photochromic moiety would be 48 µmol when the total amount of the polymerizable compound was set to 100 g.

A photochromic curable composition obtained by the kneading method was used here. The composition was cured by the following polymerization method to obtain a photochromic cured body (polymer molded article).

Polymerization Method

A glass mold and a gasket made of ethylene-vinyl acetate copolymer were used to fabricate a 2 mm-thick mold. Subsequently, the photochromic curable composition sufficiently defoamed was poured into the mold. Then, the polymerization reaction proceeded while gradually raising the temperature from 20° C. to 120° C., thereby curing the photochromic curable composition. After curing for 24 hours, the photochromic cured body was removed from the mold.

Evaluation of Photochromic Cured Body

With respect to the obtained photochromic cured body, evaluations of photochromic properties, L-scale Rockwell hardness and transparency were performed by the following methods, and the results are shown in Table 1.

(1) Photochromic Properties

A photochromic cured body was photo-irradiated using a xenon lamp L-2480 (300 W) SHL-100 manufactured by Hamamatsu Photonics K.K. via an air mass filter 2.0 (manufactured by KOYO Co., Ltd.) for color development of the photochromic cured body, and the respective photochromic properties were evaluated. The conditions in the irradiation are as follows.

Irradiation temperature: 23±0.1° C.
Emission intensity: 50,000 lux in the range of 300 to 500 nm
Irradiation time: 300 seconds Maximum absorption wavelength, color optical density, and fading rate were evaluated as photochromic properties of the photochromic cured body. Measurements were carried out using a spectrophotometer (instantaneous multi-channel photodetector MCPD1000) manufactured by Otsuka Electronics Co., Ltd.

Maximum Absorption Wavelength (λmax)

This indicates the maximum absorption wavelength in the visible light range of the photochromic cured body after color development. The maximum absorption wavelength relates to the color tone at the time of color development.

Color Optical Density {ε(300)-ε(0)}

The color optical density was evaluated by the difference between the absorbance {ε(300)} after light irradiation for 120 seconds and the absorbance ε(0) before light irradiation, at the maximum absorption wavelength. The higher this value, the better the photochromic properties.

Fading Rate [t½(Sec.)]

The photochromic cured body was irradiated with light for 300 seconds. After stopping the irradiation, the fading rate was evaluated based on the time required for the absorbance at the maximum absorption wavelength to decrease to half of {ε(300)-ε(0)}. The shorter the time, the better the photochromic properties.

(2) L Scale Rockwell Hardness (HL)

After storing the photochromic cured body (2 mm-thick) in a desiccator at 23° C. for one day, the L Scale Rockwell hardness of the cured body was measured using a Rockwell hardness meter (Model: AR-10) manufactured by Akashi Seisakusho, LTD.

(3) Transparency of Photochromic Cured Body

The photochromic cured body was visually evaluated for white turbidity under crossed Nicols. The evaluation criteria are as follows.

1: Substantially no white turbidity is observed, and the cured body is almost perfect as a product.
2: There is a very slight white turbidity that does not affect at all the quality of the product.
3: There is a slight white turbidity that does not substantially affect the quality of the product.

4: There is a white turbidity that does not substantially affect the quality of the product, though the white turbidity is stronger than that in the above level 3.
5: There is a white turbidity and the cured body cannot be employed as a product.

Example 4

A curable composition was prepared, and a photochromic cured body was produced for evaluation in the same manner as in Example 3, except that the photochromic hydroxyurethane compound (PHU1D2) obtained in Example 2 was used in place of the PHU1D1 obtained in Example 1. The evaluation results are shown in Table 1.

Comparative Examples 1 and 2

For comparison, photochromic cured bodies were obtained in the same manner as in Example 1 using the compounds represented by the following Formulae (A) and (B), and the properties thereof were evaluated. The evaluation results are shown in Table 1.

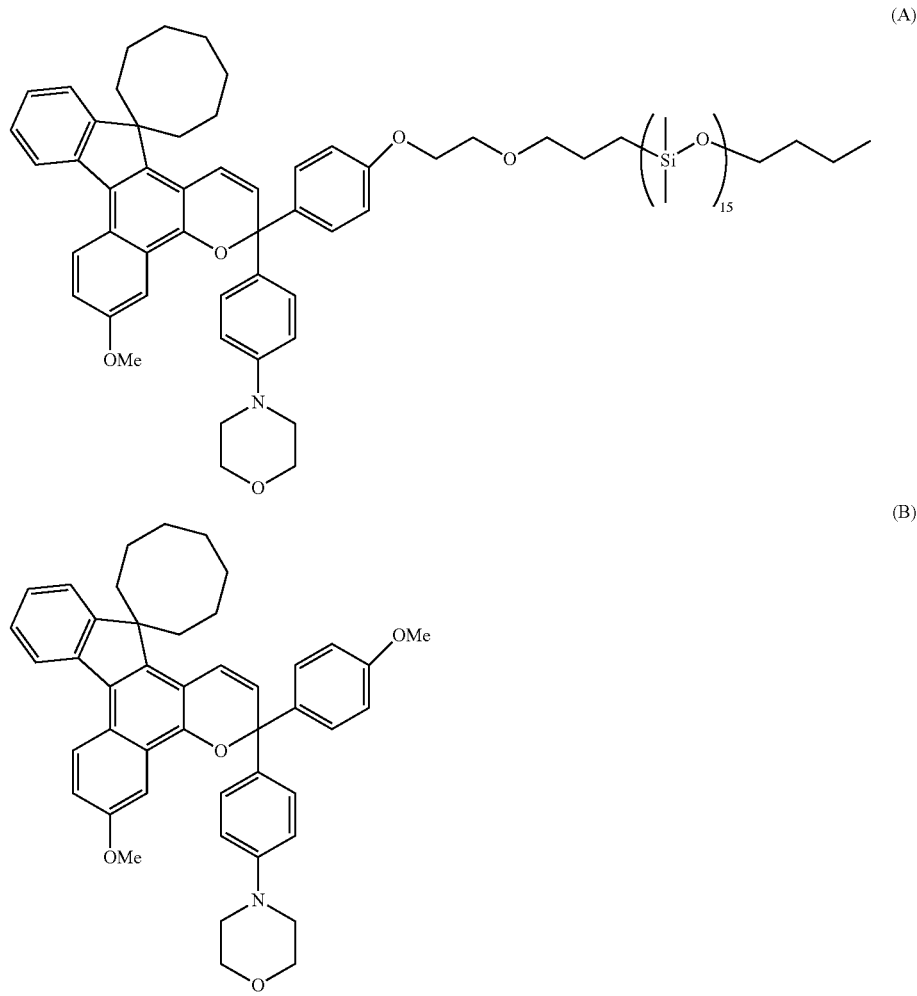

TABLE 1

| | Compound No. | Hydroxyurethane weight average molecular weight per photochromic moiety | Photochromic properties | | | | |
|---|---|---|---|---|---|---|---|
| | | | MAW* (nm) | COD* (-) | FR* (sec.) | HL | Transparency |
| Example 3 | Example. 1 (PHU1D1) | 1154 | 452 | 0.24 | 200 | 123 | 2 |
| | | | 587 | 0.42 | 200 | | |
| Example 4 | Example. 2 (PHU1D2) | 1463 | 451 | 0.2 | 240 | 127 | 1 |
| | | | 589 | 0.35 | 240 | | |

TABLE 1-continued

| | Compound No. | Hydroxyurethane weight average molecular weight per photochromic moiety | Photochromic properties | | | HL | Transparency |
|---|---|---|---|---|---|---|---|
| | | | MAW* (nm) | COD* (-) | FR* (sec.) | | |
| Comparative Example 1 | A | — | Not measurable due to turbidity | | | 123 | 5 |
| Comparative Example 2 | B | — | No photochromic properties exhibited | | | 125 | 1 |

MAW: Maximum absorption wavelength
COD: Color optical density
FR: Fading rate

Table 1 shows that the photochromic hydroxyurethane compound of the present invention is superior to a conventional photochromic compound in photochromic properties in a high hardness matrix. It is also shown that introduction of a photochromic compound into a polyhydroxyurethane chain can prevent or reduce white turbidity of a cured body, while the white turbidity is a problem difficult to solve by use of a conventional photochromic compound having an oligomer chain.

Example 5

Introduction of Polymerizable Substituent

Into the photochromic hydroxyurethane (PHU1D2) obtained in Example 2, a polymerizable substituent was introduced in the following manner.

In 7.5 mL of THF, 0.75 g (0.08 mmol) of PHU1D2 was dissolved, and 0.01 g (0.08 mmol) of 2-acryloyloxyethyl isocyanate was added dropwise to this solution. Further, 2 drops of dibutyltin dilaurate as a catalyst were added thereto, and the mixture was heated and stirred at room temperature for 24 hours, to which water was added for stopping the reaction. After extraction with toluene, the extract was concentrated on an evaporator and purified by silica gel chromatography to obtain photochromic polyhydroxyurethane (PHU1D2-2) in 80% yield.

The PHU1D2-2 has a photochromic group represented by Formula (15) (a group having a photochromic moiety) and a polymerization reactive group represented by Formula (16) below (containing an acrylic group as a polymerizable substituent).

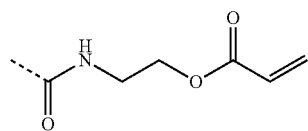

(16)

It was confirmed from $^1$H-NMR that about 0.32 (about 0.9 per molecule as a whole) polymerization reactive group shown in Formula (16) were introduced per repeating unit of PHU1.

Further, the obtained photochromic hydroxyurethane compound (PHU1D2-2) was subjected to the same structural analysis as in Example 1, and the results are as follows.
Analysis of the Group $R^3$
Rate of hydrogen atoms: 5.5%
Rate of photochromic moieties: 78.5%
Rate of polymerization reactive groups: 16%
Rate of other groups: 0%

Example 6

(Physical Property Evaluation of Photochromic Plastic Lens Produced by Coating Method)

A photochromic curable composition was prepared using the photochromic hydroxyurethane (PHU1D2-2) obtained in Example 5 according to the following formulation, and this composition was coated on the surface of the lens base material, and further irradiated with ultraviolet rays to polymerize the coating film of the composition on the surface of the lens base material.

A mixture of the following compounds is used as the radically polymerizable monomer in the photochromic curable composition prepared in the aforementioned manner.

| | |
|---|---|
| Polyethylene glycol dimethacrylate (average molecular weight: 736) | 45 parts by mass |
| Polyethylene glycol dimethacrylate (average molecular weight: 536) | 7 parts by mass |
| Trimethylolpropane trimethacrylate | 40 parts by mass |
| γ-methacryloyloxypropyl-trimethoxysilane | 2 parts by mass |
| Glycidyl methacrylate | 1 part by mass |

When the total amount of this radically polymerizable monomer is set to 100 parts by mass, the blending amount of each component is as follows.

| | |
|---|---|
| Phenylbis(2,4,6-trimethyl-benzoyl)phosphine oxide (photopolymerization initiator, Irgacure 819 manufactured by BASF) | 0.3 parts by mass |
| Ethylenebis(oxyethylene) bis[3-(5-tert-butyl-4-hydroxy-m-tolyl)propionate] (stabilizer, Irganox 245 manufactured by Ciba Specialty Chemicals) | 1 part by mass |
| Bis(1,2,2,6,6-pentamethyl-4-piperidyl) sebacate (molecular weight: 508) | 3 parts by mass |
| Leveling agent (L7001 manufactured by Toray Dow Corning Corp.) | 0.1 parts by mass |

The PHU1D2-2 as a photochromic compound was blended to be 0.23 mmol relative to 100 g of the total amount of the radically polymerizable monomer.

Polymerization curing was performed using the aforementioned photochromic curable composition under the following conditions by a lamination method to obtain a photochromic laminate.

Polymerization Curing

A thiourethane-based plastic lens having a center thickness of 2 mm and a refractive index of 1.60 was used as an optical base material. This thiourethane-based plastic lens was subjected in advance to alkali etching at 50° C. for 5 minutes using a 10% aqueous sodium hydroxide solution, and then, washed sufficiently with distilled water.

Using a spin coater (1H-DX2, manufactured by MIKASA Corporation), a moisture-curable primer (product name: TR-SC-P, manufactured by Tokuyama Corporation) was coated on the surface of the plastic lens for 15 seconds at a rotational speed of 70 rpm, and then, for 10 seconds at 1000 rpm.

Thereafter, about 2 g of the obtained photochromic composition was spin-coated for 40 seconds at a rotational speed of 60 rpm, and then, for 10 to 20 seconds at 600 rpm so that the film thickness of the photochromic coating layer became 40 μm.

The lens applied with the coating agent in this manner was then irradiated with light for 90 seconds using a metal halide lamp having a power of 200 mW/cm² in a nitrogen gas atmosphere to cure the coating film. Thereafter, the lens was further heated at 110° C. for 1 hour to form a photochromic laminate having a photochromic layer.

The thus obtained photochromic laminate was evaluated for the photochromic properties and transparency in the same manner as in Examples 3 and 4. The laminate was further subjected to a Vickers hardness evaluation by the method as described below. The evaluation results are shown in Table 2.

Vickers Hardness

The measurement was carried out using a hardness meter with an automatic measurement (reading) device (PMT-X7A, manufactured by Matsuzawa Co., Ltd.). Specifically, a Vickers indenter was pushed into the sample surface at 10 gf for 30 seconds to calculate Vickers hardness from the indentation.

Vickers hardness is an indicator of whether blemishes occur in the lens processing. As a guide, the lens will be hardly scratched when Vickers hardness exceeds 4.5 while the lens will be easily scratched when the same hardness is 4.5 or less.

TABLE 2

| | Compound No. | Hydroxyurethane weight average molecular weight per photochromic moiety | Photochromic properties | | | Vickers hardness | Transparency |
| | | | MAW* (nm) | COD* (-) | FR* (sec.) | | |
| --- | --- | --- | --- | --- | --- | --- | --- |
| Example 6 | Example 5 (PHU1D2-2) | 1154 | 456 592 | 0.74 1.41 | 38 38 | 5.5 | 1 |

MAW: Maximum absorption wavelength
COD: Color optical density
FR: Fading rate

Example 7

First Step

A reaction was performed similarly to Example 1 except that a compound of Formula (17) below was used in place of the epoxy compound of Formula (9), thereby obtaining a cyclic carbonate compound represented by Formula (18) below.

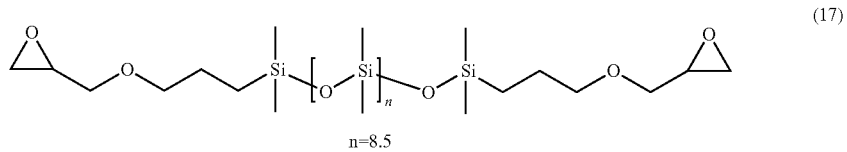

n=8.5

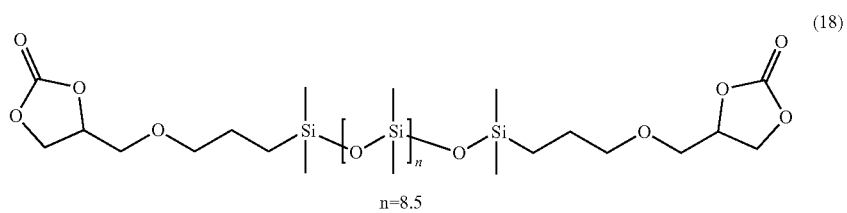

n=8.5

Second Step

A reaction was performed similarly to Example 1 except that a compound of Formula (19) below was used in place of the dodecamethylenediamine and that the compound of Formula (18) above was used in place of the compound of Formula (10), thereby obtaining PHU2 represented by Formula (20) below.

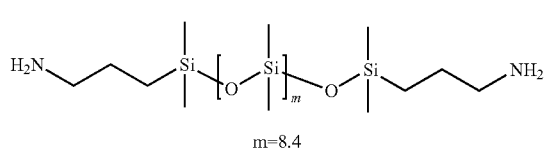
(19)

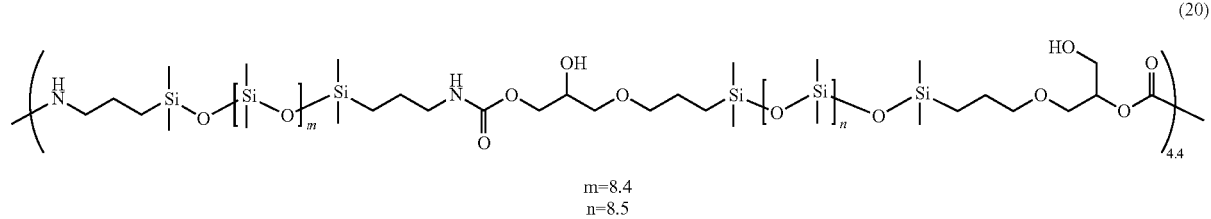
(20)

Here, the generation ratio between the hydroxyl group directly bonded to the main chain of the chain group and the hydroxyl group bonded to the side chain extending from the linear chain is randomly determined.

The obtained PHU2 was analyzed by GPC to confirm that the weight average molecular weight Mw (GPC) was 8660 (repeating number: about 4.4).

The obtained PHU2 was analyzed by FT-IR to confirm occurrence of stretching vibration of C=O derived from a urethane bond and stretching vibration of NH.

Third Step

A reaction was performed similarly to that of the third step in Example 1 except that compounds of Formulae (21) and (22) below were used in place of those of the Formulae (11) and (12), thereby synthesizing a compound represented by Formula (23) below.

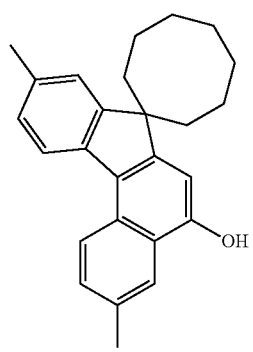
(21)

-continued

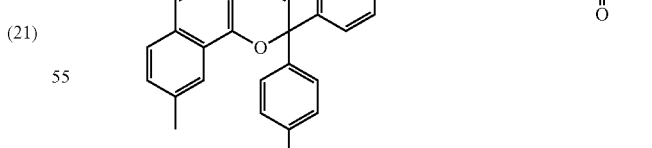
(22)

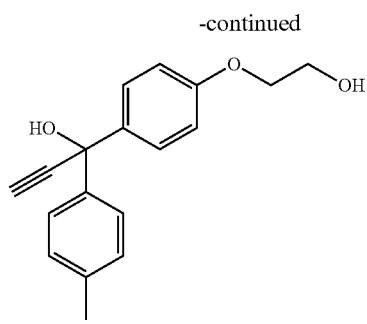
(23)

Fourth Step

A reaction was performed similarly to that of the fourth step in Example 1, except that PHU2 was used in place of the PHU1 and the Formula (23) was used in place of the Formula (14), thereby obtaining a photochromic hydroxyurethane (PHU2D1) having a photochromic group represented by Formula (24) below. The yield was 65%.

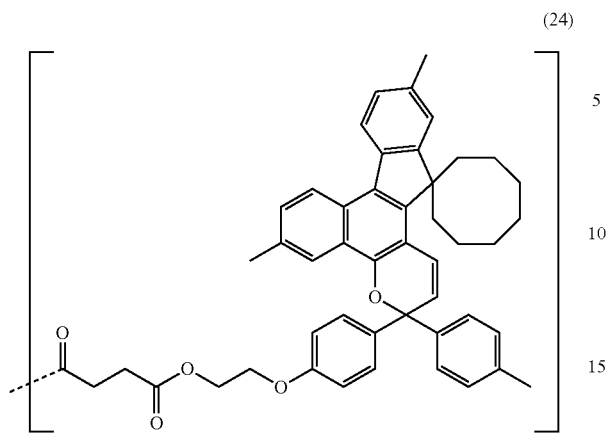

The dashed line in Formula (24) indicates a hand for bonding to hydroxyurethane (PHU2).

As for the thus obtained compound, it was confirmed from ¹H-NMR that the number of photochromic moieties (photochromic basic skeleton) contained per repeating unit of PHU2 (hydroxyurethane) was about 2.0 (about 8.8 per molecule as a whole). The number of photochromic moieties corresponds to the number of the Formula (24).

The structural formula of the obtained photochromic hydroxyurethane (PHU2D2) is as follows. Numerical values in the formula are average values.

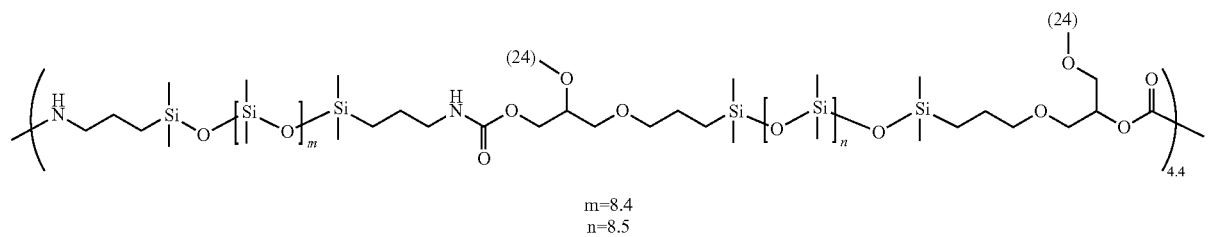

m=8.4
n=8.5

Analysis of Group $R^3$
  Rate of hydrogen atoms: 0%
  Rate of groups having photochromic moieties: 100%
  Rate of polymerization reactive groups: 0%
  Rate of other groups: 0%

The weight average molecular weight (Mw) of the hydroxyurethane moiety per photochromic group was 984.

Example 8

First Step

A reaction was performed similarly to that of Example 1 except that a compound of Formula (25) below was used in place of the epoxy compound of Formula (9), thereby obtaining a cyclic carbonate compound represented by Formula (26) below.

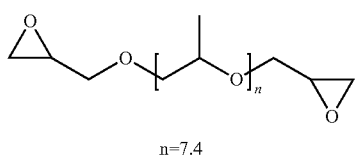

n=7.4

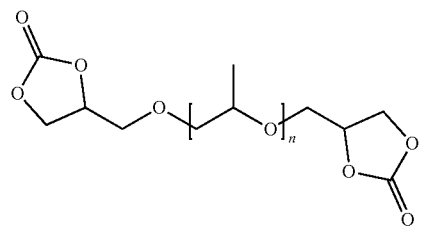

n=7.4

Second Step

A reaction was performed similarly to that of Example 1 except that a compound of Formula (27) below was used in place of the dodecamethylenediamine and that the compound of the aforementioned Formula (26) was used in place of the compound of Formula (10), thereby obtaining PHU3 represented by Formula (28) below.

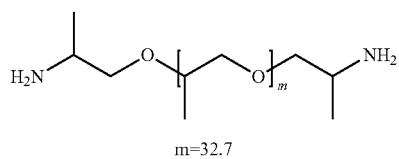

(27)

m=32.7

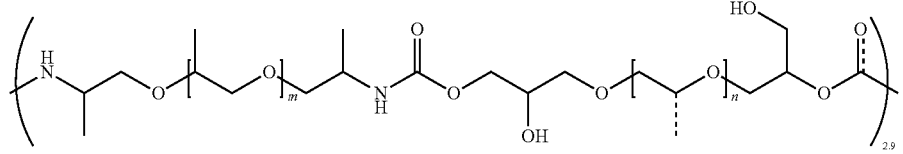

m=32.7    n=7.4

(28)

The generation ratio between the hydroxyl group directly bonded to the main chain of the chain group and the hydroxyl group bonded to the side chain extending from the linear chain is randomly determined.

The obtained PHU3 was analyzed by GPC to confirm that the weight average molecular weight Mw (GPC) was 7784 (repeating number: about 2.9).

The obtained PHU3 was analyzed by FT-IR to confirm occurrence of stretching vibration of C=O derived from a urethane bond and stretching vibration of NH.

Third Step

A reaction was performed similarly to that of the third step in Example 1 except that a compound of Formula (29) below was used in place of the compound of Formula (11), thereby synthesizing a compound represented by Formula (30) below.

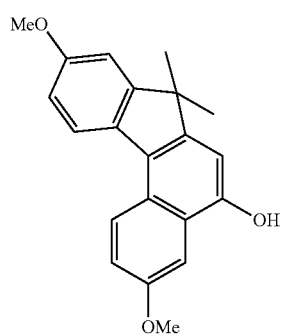

(29)

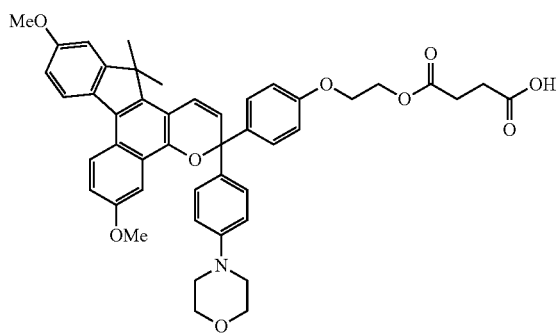

(30)

Fourth Step

A reaction was performed similarly to that of the fourth step in Example 1, except that PHU3 was used in place of the PHU1 and that Formula (30) was used in place of Formula (14), thereby obtaining a photochromic hydroxyurethane (PHU3D1) having a photochromic group represented by Formula (31) below. The yield was 69%.

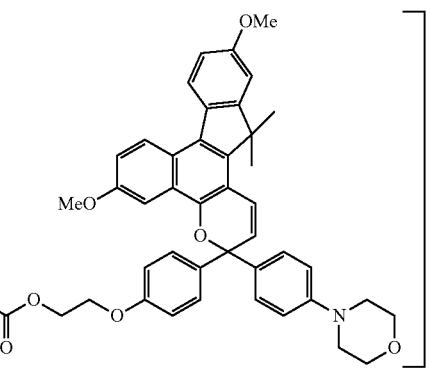

(31)

The dashed line in Formula (31) indicates a hand for bonding to hydroxyurethane (PHU3).

As for the thus obtained compound, it was confirmed from $^1$H-NMR that the number of photochromic moieties (photochromic basic skeleton) contained per repeating unit of PHU3 (hydroxyurethane) was about 2.0 (about 5.8 per molecule as a whole). The number of photochromic moieties corresponds to the number of Formula (31).

The structural formula of the obtained photochromic polyhydroxyurethane compound (PHU3D1) is as follows. Numerical values in the formula are average values.

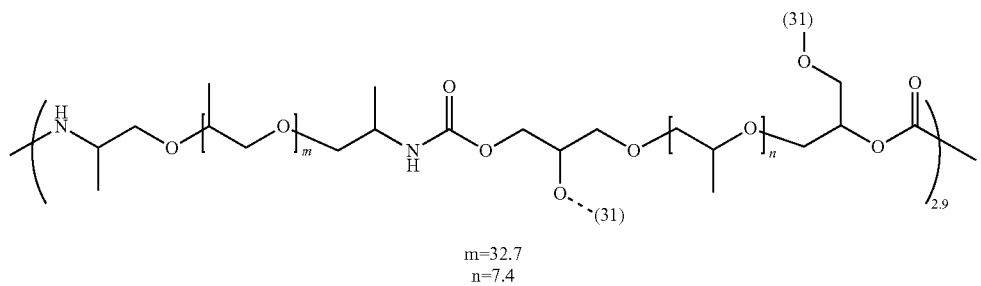

m=32.7
n=7.4

In this formula, (31) represents Formula (31), and the dashed line in this formula corresponds to the dashed line part in Formula (31).

Analysis of Group $R^3$

Rate of hydrogen atoms: 0%
Rate of groups having photochromic moieties: 100%
Rate of polymerization reactive groups: 0%
Rate of other groups: 0%

The weight average molecular weight (Mw) of the hydroxyurethane moiety per photochromic group was 1342.

Example 9

First Step

A reaction was performed similarly to that of Example 8 except that a compound of Formula (32) below was used in place of the epoxy compound of Formula (25), thereby obtaining a cyclic carbonate compound represented by Formula (33) below.

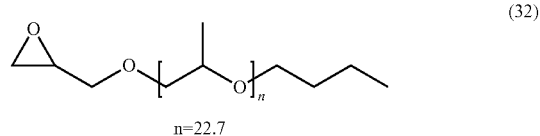

n=22.7

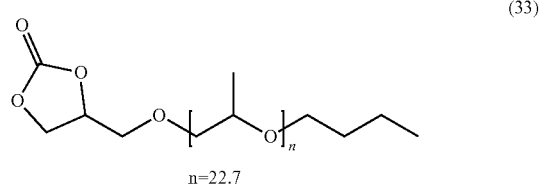

n=22.7

Second Step

A reaction was performed similarly to that of the second step in Example 8 except that the compound of Formula (33) was used in place of the compound of Formula (28), thereby obtaining HU4 represented by Formula (34) below.

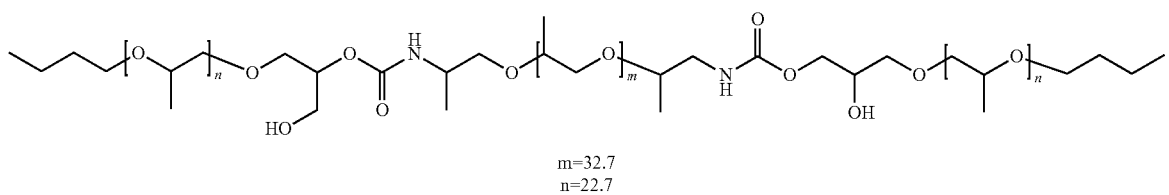

m=32.7
n=22.7

The generation ratio between the hydroxyl group directly bonded to the main chain of the chain group and the hydroxyl group bonded to the side chain extending from the linear chain is randomly determined.

The obtained HU4 was analyzed by GPC to confirm that the weight average molecular weight Mw (GPC) was 5392.

The obtained HU4 was analyzed by FT-IR to confirm occurrence of stretching vibration of C=O derived from a urethane bond and stretching vibration of NH.

Third Step

A reaction was performed similarly to that of the fourth step in Example 8, except that HU4 was used in place of the PHU3 and that Formula (35) below was used in place of Formula (30), thereby obtaining a photochromic hydroxyurethane (HU4D1) having a photochromic group represented by Formula (36) below. The yield was 78%.

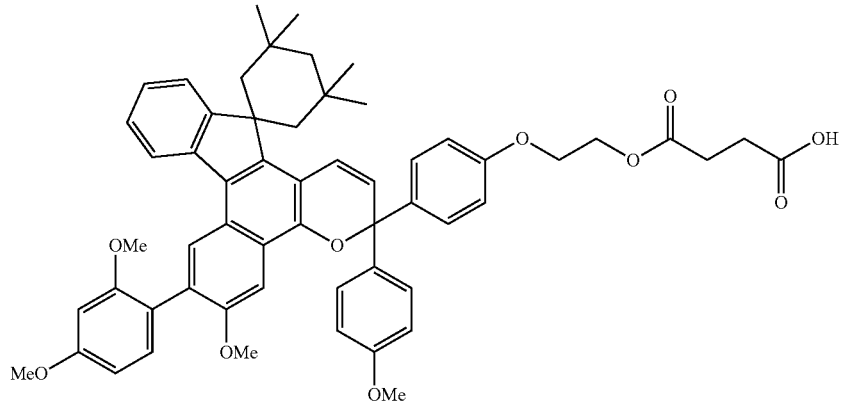

(35)

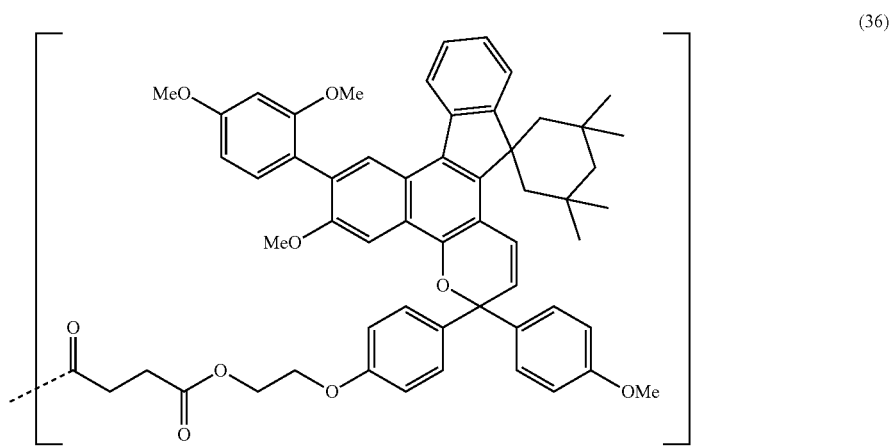

(36)

The dashed line in Formula (36) indicates a hand for bonding to hydroxyurethane (HU4).

As for the thus obtained compound, it was confirmed from $^1$H-NMR that the number of photochromic moieties (photochromic basic skeleton) contained in HU4 (hydroxyurethane) was about 2.0. The number of photochromic moieties corresponds to the number of Formula (36).

The structural formula of the obtained photochromic hydroxyurethane compound (HU4D1) is as follows. Numerical values in the formula are average values.

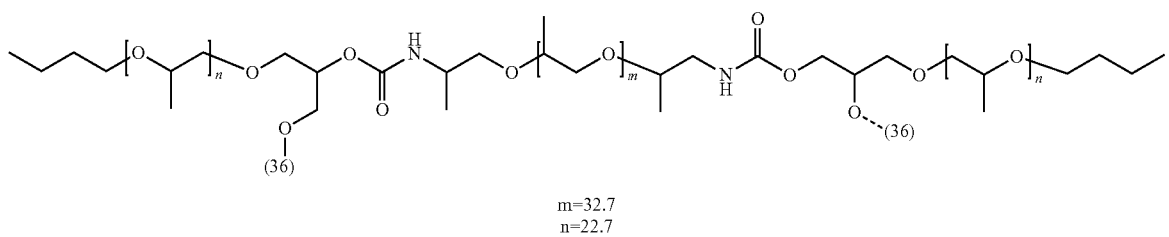

m=32.7
n=22.7

In this formula, (36) represents the Formula (36), and the dashed line in this formula corresponds to the dashed line part in the Formula (36).
Analysis of Group $R^3$
Rate of hydrogen atoms: 0%
Rate of groups having photochromic moieties: 100%
Rate of polymerization reactive groups: 0%
Rate of other groups: 0%
The weight average molecular weight (Mw) of the hydroxyurethane moiety per photochromic group was 2696.

Example 10

First Step

A reaction was performed similarly to that of the first step in Example 8 except that a compound of Formula (37) below was used in place of the epoxy compound of Formula (25), thereby obtaining a cyclic carbonate compound represented by Formula (38) below.

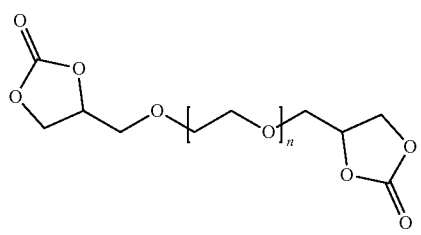

n=37.5

-continued

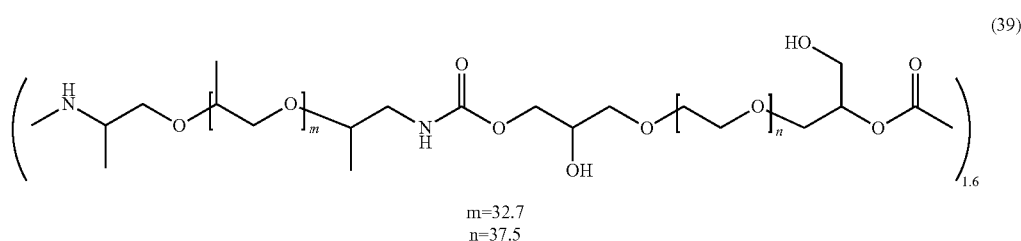

n=37.5

Second Step

A reaction was performed similarly to that of the second step in Example 8 except that the compound of Formula (38) was used in place of the compound of Formula (27), thereby obtaining PHU5 represented by Formula (39) below.

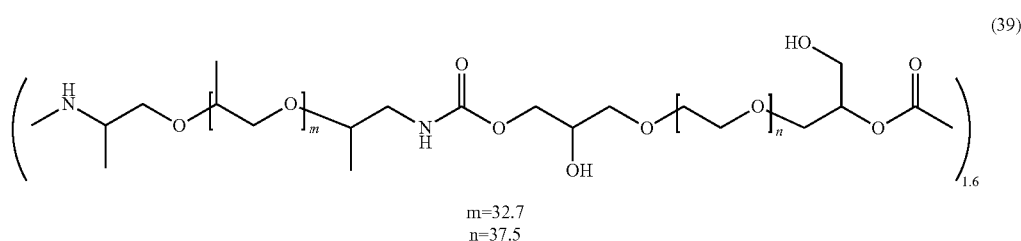

m=32.7
n=37.5

The generation ratio between the hydroxyl group directly bonded to the main chain of the chain group and the hydroxyl group bonded to the side chain extending from the linear chain is randomly determined.

The obtained PHU5 was analyzed by GPC to confirm that the weight average molecular weight Mw (GPC) was 6608 (repeating number: about 1.6).

The obtained PHU5 was analyzed by FT-IR to confirm occurrence of stretching vibration of C=O derived from a urethane bond and stretching vibration of NH.

Third Step

A reaction was performed similarly to that of the third step in Example 1 except that a compound of Formula (40) below was used in place of the compound of Formula (11), thereby synthesizing a compound represented by Formula (41) below.

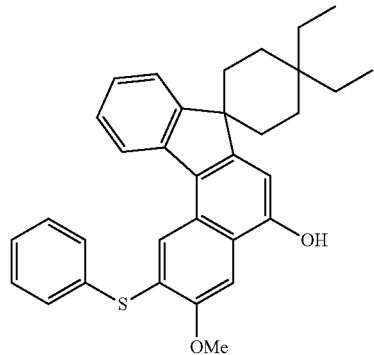

(40)

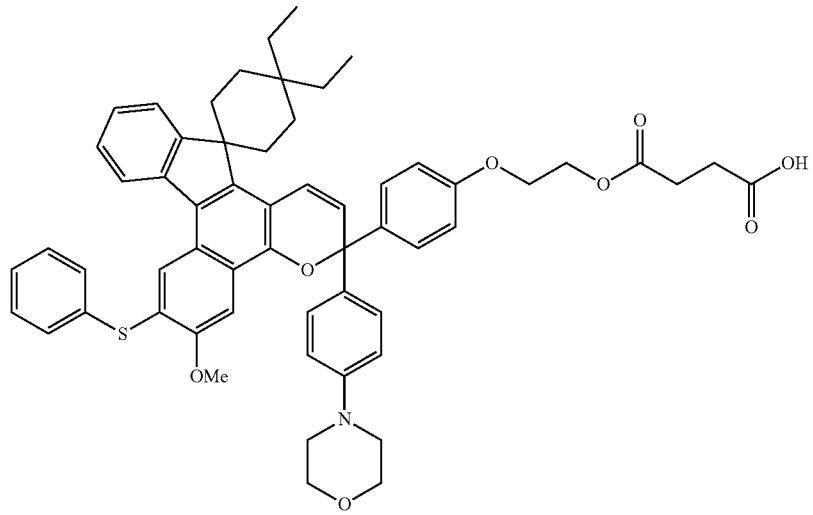

(41)

Fourth Step

A reaction was performed similarly to that of the fourth step in Example 1, except that PHU5 was used in place of the PHU1 and that Formula (41) was used in place of Formula (14), thereby obtaining a photochromic hydroxyurethane (PHU5D1) having a photochromic group represented by Formula (42) below. The yield was 62%.

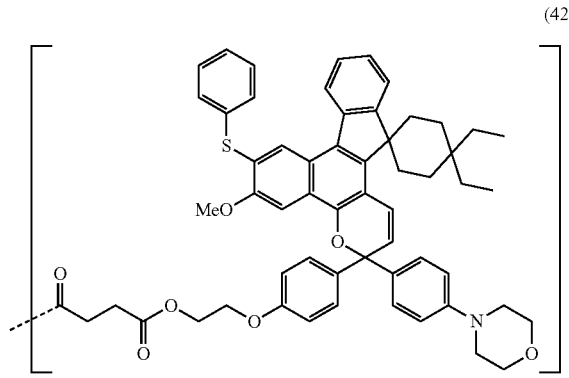

(42)

The dashed line in Formula (42) indicates a hand for bonding to hydroxyurethane (PHU5).

As for the thus obtained compound, it was confirmed from $^1$H-NMR that the number of photochromic moieties (photochromic basic skeleton) contained in PHU5 (hydroxyurethane) was about 2.0 (about 3.2 per molecule as a whole). The number of photochromic moieties corresponds to the number of Formula (42).

The structural formula of the obtained photochromic polyhydroxyurethane compound (PHU5D1) is as follows. Numerical values in the formula are average values. (The dashed line in the formula indicates a bond with PHU5.)

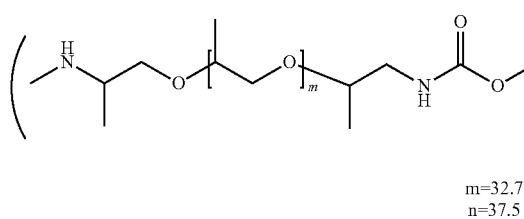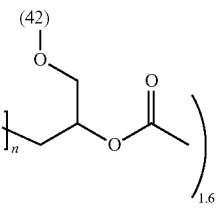

m=32.7
n=37.5

Analysis of Group $R^3$
  Rate of hydrogen atoms: 0%
  Rate of groups having photochromic moieties: 100%
  Rate of polymerization reactive groups: 0%
  Rate of other groups: 0%
The weight average molecular weight (Mw) of the hydroxyurethane moiety per photochromic group was 2065.

Example 11

First Step

Operations similar to those of the fourth step in Example 10 were performed except that the use amount of the compound represented by Formula (41) was decreased to half (1 equivalent of hydroxyurethane) to perform the reaction, thereby obtaining a photochromic polyhydroxyurethane compound (PHU5D2) in a yield of 54%.

It was confirmed from $^1$H-NMR that the number of photochromic moieties (photochromic basic skeleton) contained per repeating unit of PHU5 (hydroxyurethane) was about 1.21 (about 1.94 per molecule as a whole). The number of photochromic moieties corresponds to the number of Formula (42).

The properties of the obtained photochromic polyhydroxyurethane compound (PHU5D2) are shown below. The numerical values are average values.

Analysis of Group $R^3$
  Rate of hydrogen atoms: 29.5%
  Rate of groups having photochromic moieties: 60.5%
  Rate of polymerization reactive groups: 0%
  Rate of other groups: 0%
The weight average molecular weight (Mw) of the hydroxyurethane moiety per photochromic group was 3413.

Example 12

First Step

Operations similar to those of the fourth step in Example 10 were performed except that the use amount of the compound represented by Formula (41) was decreased to 30% (0.6 equivalent of hydroxyurethane) to perform the reaction, thereby obtaining a photochromic polyhydroxyurethane compound (PHU5D3) in a yield of 43%.

It was confirmed from $^1$H-NMR that the number of photochromic moieties (photochromic basic skeleton) contained per repeating unit of PHU5 was about 0.68 (about 1.09 per molecule as a whole). The number of photochromic moieties corresponds to the number of Formula (42).

The properties of the obtained photochromic polyhydroxyurethane compound (PHU5D3) are shown below. The numerical values are average values.

Analysis of Group $R^3$
  Rate of hydrogen atoms: 66.0%
  Rate of groups having photochromic moieties: 34.0%
  Rate of polymerization reactive groups: 0%
  Rate of other groups: 0%
The weight average molecular weight (Mw) of the hydroxyurethane moiety per photochromic group was 6062.

Examples 13 to 18

(Physical Property Evaluation of Photochromic Plastic Lens Produced by Bonding Method (Lamination Method))

Photochromic curable compositions were prepared using the photochromic hydroxyurethanes obtained in Examples 7 to 12 according to the following formulations, and the compositions were cast-polymerized on the surface of a lens base material.
(Preparation of Curable Composition)
According to the following formulation, the respective components were thoroughly mixed to prepare a photochromic curable composition.
(Blending Ratios of Polymerizable Compounds)
1,3-Bis(isocyanatomethyl)cyclohexane: 43.0 parts by mass
Pentaerythritoltetrakis(3-mercaptopropionate): 49.4 parts by mass
Tridecanel-thiol: 3.3 parts by mass
RX-1: 4.3 parts by mass
RX-1 is a polyrotaxane monomer synthesized by the method described in the third step of Example 1 in WO 2018/235771 (i.e., pr1; see Reference Example 1 in WO 2018/235771).

The total of these polymerizable compounds was 100 parts by mass.

In 100 parts by mass of the total of the polymerizable compounds, 0.05 parts by mass of dimethyldichlorotin was blended.

The photochromic curable composition was added so that the photochromic moiety of the photochromic polyhydroxyurethane compound would be 0.1 mmol relative to the totally 100 g of polymerizable compounds described above. Using the photochromic curable composition, a photochromic laminate was obtained by a bonding method. The polymerization method is described below.

The photochromic curable composition was sufficiently defoamed, and then, it was injected into a mold composed of a glass plate and a thiourethane-based plastic lens having a refractive index of 1.60 so as to have a gap of 1 mm, thereby polymerizing a photochromic curable composition by cast-polymerization. The polymerized composition was cured for 18 hours by gradually raising the temperature from 27° C. to 120° C. After the polymerization, only the glass plate was removed, thereby obtaining a laminated photochromic optical article having a 1 mm-thick photochromic layer laminated on the thiourethane-based plastic lens having a refractive index of 1.60.

The thus obtained photochromic laminate was evaluated as a sample.

Comparative Examples 3 and 4

For comparison, the aforementioned Formula (A) and the following Formula (C) were used.

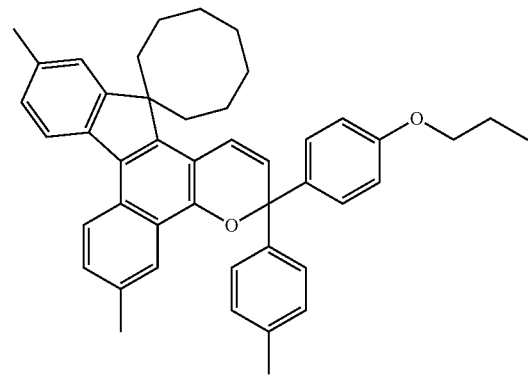

(C)

The objects for evaluation include those of Example 3, namely, the photochromic properties and the white turbidity, and the results are shown in Table 3.

TABLE 3

| | Compound No. | Hydroxyurethane weight average molecular weight per photochromic moiety | Photochromic properties | | | Transparency |
|---|---|---|---|---|---|---|
| | | | MAW* (nm) | COD* (-) | FR* (sec.) | |
| Example 13 | PHU2D1 (Example 7) | 984 | 429 550 | 0.69 1.27 | 284 283 | 2 |
| Example 14 | PHU3D1 (Example 8) | 1342 | 463 606 | 0.49 1.01 | 220 219 | 1 |
| Example 15 | HU4D1 (Example 9) | 2696 | 449 573 | 0.54 0.52 | 89 89 | 1 |
| Example 16 | PHU5D1 (Example 10) | 2065 | 484 589 | 0.46 0.52 | 147 148 | 1 |
| Example 17 | PHU5D2 (Example 11) | 3413 | 482 587 | 0.44 0.51 | 155 156 | 1 |
| Example 18 | PHU5D3 (Example 12) | 6062 | 480 582 | 0.39 0.45 | 182 186 | 1 |
| Comparative Example 3 | A | — | Not measurable due to strong white turbidity | | | 5 |
| Comparative Example 4 | C | — | 434 552 | 0.22 0.41 | 570 573 | 1 |

MAW: Maximum absorption wavelength
COD: Color optical density
FR: Fading rate

Example 19

First Step

A reaction was performed similarly to that of the second step in Example 10 except that the compound of Formula (43) below was used in place of that of Formula (38), thereby obtaining PHU6 represented by Formula (44) below.

(43)

m=31.4

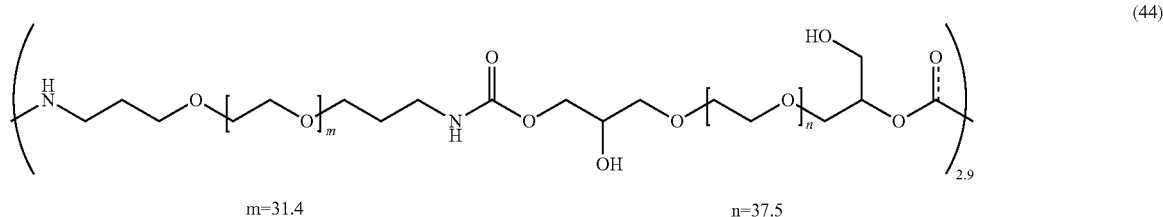

(44)

m=31.4   n=37.5

The generation ratio between the hydroxyl group directly bonded to the main chain of the chain group and the hydroxyl group bonded to the side chain extending from the linear chain is randomly determined.

The obtained PHU6 was analyzed by GPC to confirm that the weight average molecular weight Mw (GPC) was 7070 (repeating number: about 2.1).

The obtained PHU6 was analyzed by FT-IR to confirm occurrence of stretching vibration of C=O derived from a urethane bond and stretching vibration of NH.

Second Step

A reaction was performed similarly to that of the third step in Example 1, except that a compound of Formula (45) below was used in place of the compound of Formula (11) and that a compound of Formula (46) below was used in place of the compound of Formula (12), thereby obtaining a compound represented by Formula (47) below.

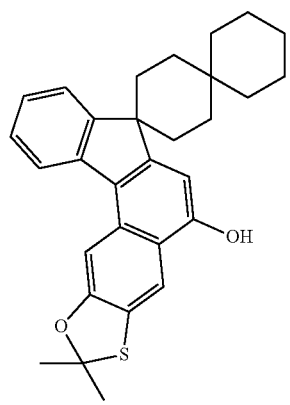

(45)

-continued

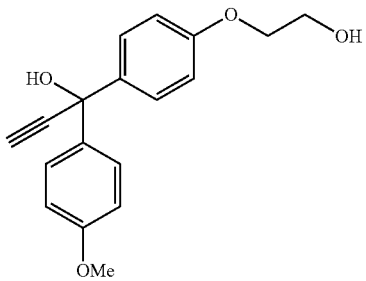

(46)

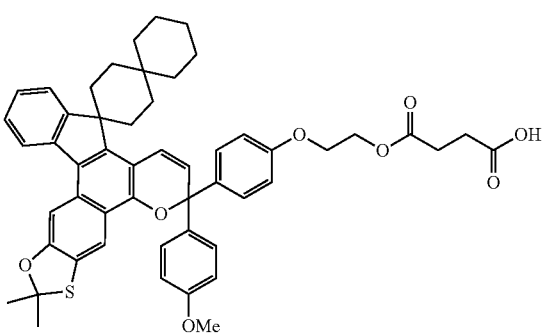

(47)

Third Step

A reaction was performed similarly to that of the fourth step in Example 1, except that PHU6 was used in place of the PHU1 and that Formula (47) below was used in place of Formula (14), thereby obtaining a photochromic hydroxyurethane (PHU6D1) having a photochromic group represented by Formula (48) below. The yield was 60%.

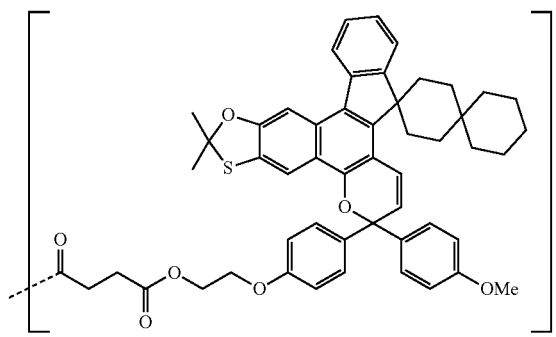

(48)

The dashed line in Formula (48) indicates a hand for bonding to hydroxyurethane (PHU6).

As for the thus obtained compound, it was confirmed from $^1$H-NMR that the number of photochromic moieties (photochromic basic skeleton) contained in the PHU6 (hydroxyurethane) was about 2.0 (about 4.2 per molecule as a whole). The number of photochromic moieties corresponds to the number of Formula (48).

The structural formula of the obtained photochromic polyhydroxyurethane compound (PHU6D1) is as follows. Numerical values in the formula are average values. (The dashed line in the formula indicates a bond with PHU6.)

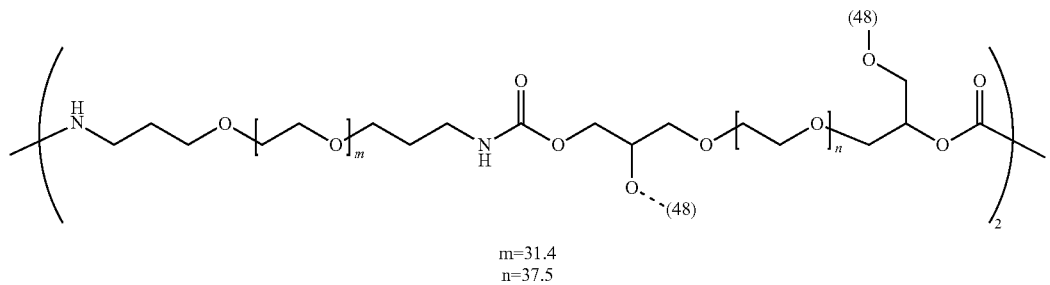

m=31.4
n=37.5

Analysis of Group $R^3$
  Rate of hydrogen atoms: 0%
  Rate of groups having photochromic moieties: 100%
  Rate of groups having polymerizable substituent groups: 0%
  Rate of groups having other groups: 0%

The weight average molecular weight (Mw) of the hydroxyurethane moiety per photochromic group was 1683.

Example 20

First Step

Operations similar to those of the first step in Example 2 were performed except that the compound of Formula (47) was used in place of the compound of Formula (14) and that PHU6 was used in place of PHU1, thereby obtaining a photochromic polyhydroxyurethane compound (PHU6D2) in a yield of 57%. It was confirmed from $^1$H-NMR that the number of photochromic moieties indicated as above Formula contained per repeating unit of PHU6 was about 1.48 (the photochromic moieties: about 3.1 as a whole).

Analysis of Group $R^3$
  Rate of hydrogen atoms: 26.0%
  Rate of groups having photochromic moieties: 74.0%
  Rate of polymerization reactive groups: 0%
  Rate of other groups: 0%

Second Step

In this step, 10 g (20 mmol) of polyethylene glycol monomethacrylate having a number average molecular weight of 500, 2.2 g (22 mmol) of succinic anhydride and 3.3 g (3.3 mmol) of trimethylamine were prepared, to which 100 mL of dichloromethane was added. These were stirred at room temperature for 12 hours. After a reaction thereof, the dichloromethane was distilled off under a reduced pressure, and the obtained residue was purified by silica gel chromatography to obtain a compound represented by Formula (49) in a yield of 88%.

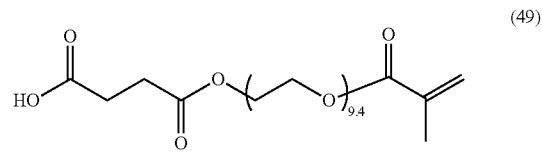

(49)

In 15 mL of THF, 0.6 g (0.10 mmol) of the compound of Formula (49) obtained in the aforementioned manner and 0.83 g (0.10 mmol) of PHU6D2 were dissolved, to which 192 mg of WSC (water-soluble carbodiimide) and 63 mg of DMAP (dimethylaminopyridine) were added. These were stirred while shielding light for 12 hours. After a reaction thereof, water was added to stop the reaction, extraction was performed with toluene, and concentration was performed on an evaporator.

The thus obtained residue was dissolved in chloroform, and purified using recycling preparative HPLC (Labo-Ace7080) manufactured by Japan Analytical Industry Co., Ltd. In the purification, chloroform was used as the mobile phase, and JAIGELHR-2.5HR and JAIGELHR-3HR connected in series were used as the preparative columns, so that photochromic polyhydroxyurethane (PHU6D2-2) was obtained in a 75% yield.

This PHU6D2-2 has a photochromic group represented by the aforementioned Formula (48) (a group having a photochromic moiety) and a polymerization reactive group represented by Formula (50) below (containing a methacrylic group as a polymerizable substituent).

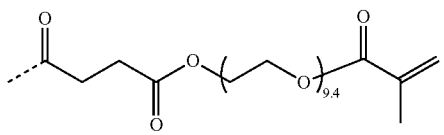
(50)

It was confirmed from $^1$H-NMR that about 0.51 (about 1.07 per molecule as a whole) polymerization reactive groups indicated by the aforementioned formula were introduced per repeating unit of the PHU6.

The properties of the obtained photochromic polyhydroxyurethane compound (PHU6D2-2) are shown below. The numerical values are average values.

Analysis of Group $R^3$
 Rate of hydrogen atoms: 0.5%
 Rate of groups having photochromic moieties: 74.0%
 Rate of polymerization reactive groups: 25.5%
 Rate of other groups: 0%

The weight average molecular weight (Mw) of the hydroxyurethane moiety per photochromic group was 2275.

Examples 21 to 26

(Physical Property Evaluation of Photochromic Plastic Lens Produced by Coating Method)

Photochromic laminates were prepared and evaluated in the same manner as in Example 6.

Compound C was similarly evaluated as Comparative Example 5.

The results are shown in Table 4.

The comparison in Table 4 between Example 21 and Comparative Example clarifies that the compounds of the present invention exhibit excellent photochromic properties.

Example 27

First Step

A reaction was performed similarly to that of the first step in Example 8, except that a compound of Formula (51) below was used in place of the compound of Formula (25), thereby obtaining a cyclic carbonate compound represented by Formula (52) below.

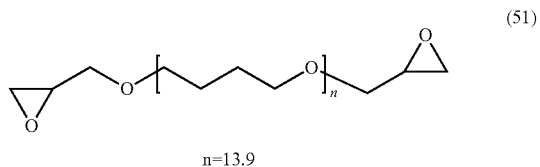
(51)

n=13.9

TABLE 4

| | Compound No. | Hydroxyurethane weight average molecular weight per photochromic moiety | Photochromic properties | | | Vickers hardness | Trans-parency |
|---|---|---|---|---|---|---|---|
| | | | MAW* (nm) | COD* (-) | FR* (sec.) | | |
| Example 21 | PHU2D1 (Example 7) | 984 | 427 545 | 0.74 1.39 | 88 88 | 5.2 | 1 |
| Example 22 | PHU3D1 (Example 8) | 1342 | 460 611 | 0.50 1.04 | 85 86 | 5.1 | 1 |
| Example 23 | HU4D1 (Example 9) | 2696 | 449 562 | 0.61 0.60 | 31 32 | 4.9 | 1 |
| Example 24 | PHU5D1 (Example 10) | 2065 | 480 587 | 0.62 0.74 | 41 41 | 5.0 | 1 |
| Example 25 | PHU6D1 (Example 19) | 1683 | 458 571 | 0.89 0.65 | 39 40 | 5.1 | 1 |
| Example 26 | PHU6D2 (Example 20) | 2275 | 456 570 | 0.84 0.63 | 42 43 | 5.4 | 1 |
| Comparative Example 5 | C | — | 427 545 | 0.70 1.30 | 133 133 | 5.5 | 1 |

MAW: Maximum absorption wavelength
COD: Color optical density
FR: Fading rate

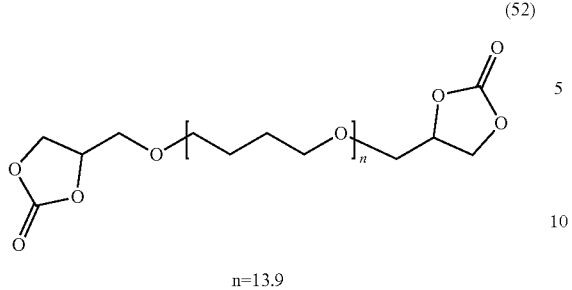

(52)

n=13.9

Second Step

A reaction was performed similarly to that of the second step in Example 8, except that a compound of Formula (52) below was used in place of the compound of Formula (26), thereby obtaining PHU7 represented by Formula (53) below.

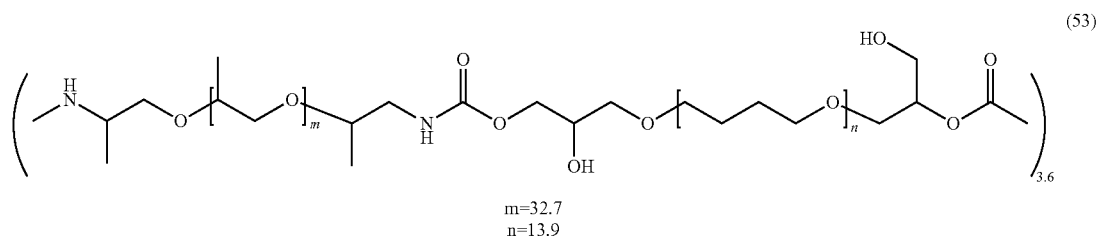

(53)

m=32.7
n=13.9

The generation ratio between the hydroxyl group directly bonded to the main chain of the chain group and the hydroxyl group bonded to the side chain extending from the linear chain is randomly determined.

The obtained PHU7 was analyzed by GPC to confirm that the weight average molecular weight Mw (GPC) was 11640 (repeating number: about 3.6).

The obtained PHU7 was analyzed by FT-IR to confirm occurrence of stretching vibration of C=O derived from a urethane bond and stretching vibration of NH.

Third Step

A reaction was performed similarly to that of the third step in Example 1, except that Formula (54) below was used in place of Formula (13), thereby obtaining a compound represented by Formula (55) below.

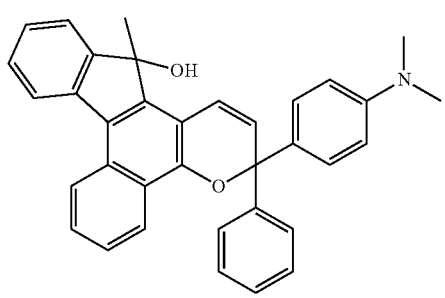

(54)

-continued

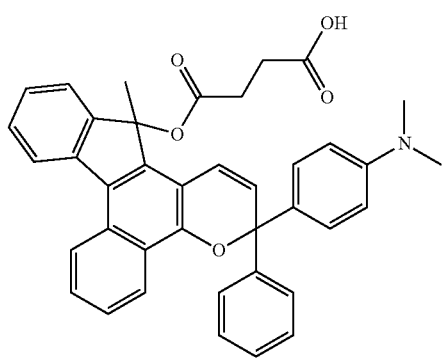

(55)

Fourth Step

A reaction was performed similarly to that of the fourth step in Example 1, except that PHU7 was used in place of the PHU1 and that a compound of Formula (55) was used in place of that of Formula (14), thereby obtaining a photochromic hydroxyurethane (PHU7D1) having a photochromic group represented by Formula (56) below. The yield was 58%.

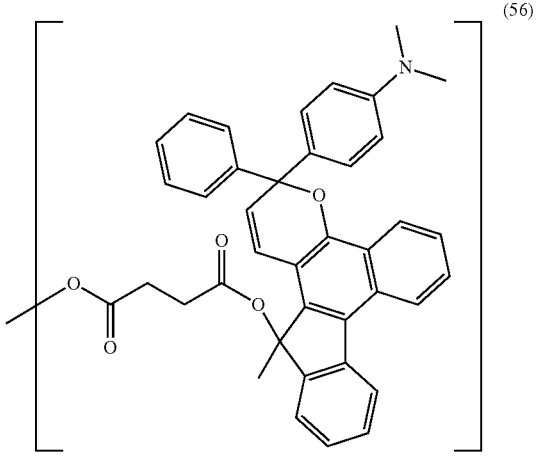

(56)

The dashed line in Formula (56) indicates a hand for bonding to hydroxyurethane (PHU7).

As for the thus obtained compound, it was confirmed from $^1$H-NMR that the number of photochromic moieties (photochromic basic skeleton) contained per repeating unit of PHU7 (hydroxyurethane) was about 2.0 (about 7.2 per molecule as a whole). The number of photochromic moieties corresponds to the number of the Formula (56).

The structural formula of the obtained photochromic polyhydroxyurethane compound (PHU7D1) is as follows. Numerical values in the formula are average values.

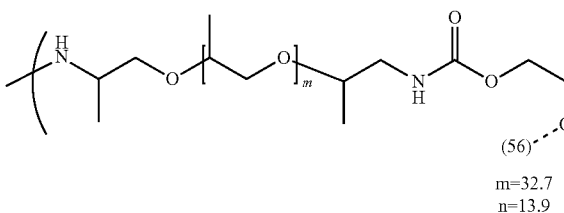

$m=32.7$
$n=13.9$

Analysis of Group $R^3$
 Rate of hydrogen atoms: 0%
 Rate of groups having photochromic moieties: 100%
 Rate of polymerization reactive groups: 0%
 Rate of other groups: 0%
The weight average molecular weight (Mw) of the hydroxyurethane moiety per photochromic group was 1617.

Example 28

(Physical Property Evaluation of Photochromic Laminate Produced by Binder Method)
(Preparation of Photochromic Layer (Photochromic Adhesive Layer))
A photochromic layer was produced by the following method.
1. Production of Terminal Non-Reactive Urethane Urea Resin
A 2 L four-neck flask fitted with a stirring blade, a condenser, a thermometer, and a nitrogen gas inlet tube was prepared. Into this flask, 158 parts by mass of polycarbonate diol having a number average molecular weight of 500, 100 parts by mass of isophorone diisocyanate, and 72 parts by mass of toluene were charged for reaction in a nitrogen atmosphere at 100° C. for 7 hours, thereby synthesizing a urethane prepolymer having an isocyanate group at the terminal.

After the synthesis of the urethane prepolymer, the reaction solution was cooled to approximately 0° C., dissolved in 205 parts by mass of isopropyl alcohol and 382 parts by mass of diethyl ketone, and then, the temperature of this liquid was held at 0° C.

Then, a mixed solution of 23 parts by mass of bis-(4-aminocyclohexyl)methane as a chain extender and 20 parts by mass of diethyl ketone was added dropwise within 30 minutes and allowed to react at 0° C. for 1 hour.

Thereafter, 5.7 parts by mass of 1,2,2,6,6-pentamethyl-4-aminopiperidine was further added dropwise and allowed to react at 0° C. for 1 hour to obtain a diethyl ketone solution of the terminal non-reactive urethane urea resin.

2. Preparation of Composition for Forming Photochromic Layer

Relative to 100 parts by mass of the solid content of the obtained solution of terminal non-reactive urethane urea resin, 4 parts by mass of isomer mixture of 4,4'-methylenebis(cyclohexylisocyanate) (polyisocyanate compound), 0.4 parts by mass of ethylenebis(oxyethylene)bis[3-(5-tert-butyl-4-hydroxy-m-tol yl)propionate] as an antioxidant, and 0.06 parts by mass of DOW CORNING TORAY L-7001 (Product name) as a surfactant were blended.

Further, PHU7D1 was added so that the photochromic moiety would be 0.23 mmol relative to 100 g of the solid content of the solution of the terminal non-reactive urethane urea resin, and then, stirring and mixing were performed at room temperature to obtain a composition for forming a photochromic layer.

3. Synthesis of Adhesive for Adhesive Layer (Terminal Non-Reactive Urethane Urea Resin)

A 5 L four-neck separable flask fitted with a stirring blade, a condenser, a thermometer, and a nitrogen gas inlet tube was prepared. In this flask as a container, 400 parts by mass of polycarbonate diol having a number average molecular weight of 1000, 175 parts by mass of isophorone diisocyanate, and 120 parts by mass of toluene were charged and allowed to react in a nitrogen atmosphere at 110° C. for 7 hours, thereby synthesizing a urethane prepolymer having an isocyanate group at the terminal.

After the synthesis of the urethane prepolymer, the reaction solution was cooled to approximately 20° C., dissolved in 2500 parts by mass of propylene glycol-monomethylether, and then, the temperature of this liquid was kept at 20° C.

Then, 60 parts by mass of isophoronediamine as a chain extender was added dropwise so as to perform a reaction at

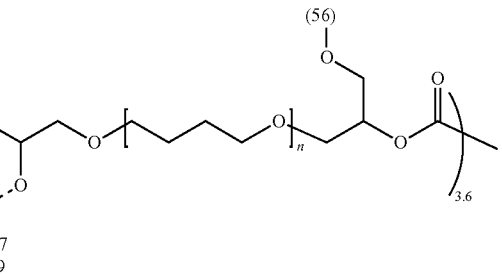

20° C. for 1 hour. Thereafter, 3 parts by mass of n-butylamine was further added dropwise and allowed to react at 20° C. for 1 hour to obtain a propylene glycol-monomethylether solution of a terminal non-reactive urethane urea resin.

To 500 parts by mass of the obtained terminal non-reactive urethane urea resin solution, 0.2 parts by mass of DOW CORNING TORAY L-7001 (Product name) was added as a surfactant, and stirring and mixing were performed at room temperature to obtain an adhesive for an adhesive layer.

4. Production of Photochromic Laminate

Using a coater (manufactured by Tester Sangyo Co., Ltd.), the adhesive for an adhesive layer was coated on polycarbonate sheets having a thickness of 400 μm (first and second optical sheets: one of which would make an optical base material and the other would make a layer free of photochromic compound) at a coating rate of 0.5 m/min and dried at a drying temperature of 110° C. for 3 minutes, so as to obtain polycarbonate sheets having an adhesive resin layer having a film thickness of 5 μm.

Next, using a coater (manufactured by Tester Sangyo Co., Ltd.), the composition for forming a photochromic layer was coated on an OPP film (stretched polypropylene film) having a thickness of 50 μm at a coating rate of 0.3 m/min and dried at a drying temperature of 100° C. for 5 minutes, thereby forming a photochromic layer. Thereafter, the photochromic layer (thickness: 40 μm) was placed on the adhesive resin layer of the first optical sheet having the adhesive resin layer and bonded to the adhesive resin layer.

The thus prepared laminate comprised the first optical sheet, the adhesive resin layer, the photochromic layer and the OPP film in this order. From this laminate, the OPP film was peeled off to provide a structural body. The structural body and the polycarbonate sheet (second optical sheet) having an adhesive resin layer were bonded together so that the photochromic layer and the adhesive resin layer on the polycarbonate sheet (second optical sheet) were bonded to each other.

Next, the obtained laminate was left standing for 24 hours at 40° C. under vacuum, which was then heat-treated at 110° C. for 60 minutes, and further subjected to humidification treatment at 60° C. and 100% RH for 24 hours. Finally, the laminate was left standing at 40° C. for 24 hours under vacuum, whereby a photochromic laminate was obtained.

The obtained photochromic laminate was subjected to the same evaluation as in Example 13. For comparison, a compound of Formula (D) below was used (Comparative Example 6). Evaluation results are shown in Table 5.

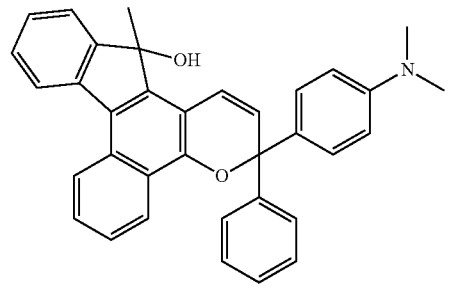

(D)

TABLE 5

| | Compound No. | Hydroxyurethane weight average molecular weight per photochromic moiety | Photochromic properties | | | |
| --- | --- | --- | --- | --- | --- | --- |
| | | | MAW* (nm) | COD* (-) | FR* (sec.) | Transparency |
| Example 28 | PHU7D1 (Example 27) | 1617 | 586 | 0.50 | 20 | 1 |
| Comparative Example 6 | D | — | 585 | 0.48 | 26 | 1 |

MAW: Maximum absorption wavelength
COD: Color optical density
FR: Fading rate

The results shows that the photochromic compound of the present invention exhibits excellent photochromic properties also in the binder method.

The invention claimed is:

1. A photochromic hydroxyurethane compound having at least one of hydroxyurethane constitutional unit represented by Formula (1), on a condition of having in a molecule at least one photochromic moiety as a photochromic minimum unit selected from a naphthopyran skeleton:

—X—O—CO—NH—  (1)

in the formula, X is an oxygen-containing chain organic group having a hydroxyl group as a substituent, or an oxygen-containing chain organic group in which a hydrogen atom of the hydroxyl group is substituted with the following groups (A) to (E):

(A) a photochromic group having the photochromic moiety, (B) a polymerization reactive group having a polymerizable substituent, (C) an alkyl group having 1 to 10 carbon atoms, (D) a cycloalkyl group having 3 to 10 carbon atoms, or (E) an aryl group having 6 to 14 carbon atoms, where the groups (C) to (E) each is allowed to be bonded to an oxygen atom derived from a hydroxyl group via the oxygen-containing chain organic group.

2. The photochromic hydroxyurethane compound according to claim 1, having a plurality of the hydroxyurethane constitutional units, wherein the at least one photochromic moiety is present in the at least one of hydroxyurethane constitutional units.

3. The photochromic hydroxyurethane compound according to claim 2, which is represented by Formula (2):

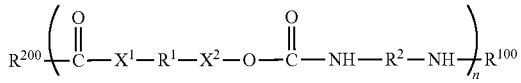
(2)

in the formula,
n is an integer from 1 to 100,
$R^{100}$ is a hydrogen atom, an alkyl group having 1 to 30 carbon atoms, an alkoxy group having 1 to 30 carbon atoms, or an aryl group having 6 to 14 carbon atoms,
$R^{200}$ is a hydroxyl group, an alkyl group having 1 to 30 carbon atoms, an alkoxy group having 1 to 30 carbon atoms, or an aryl group having 6 to 14 carbon atoms,
$-X^1-R^1-X^2-$ is a group corresponding to the group X in Formula (1),
$X^1$ and $X^2$ each is a divalent group represented by the following Formulae (2a) to (2d):

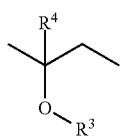
(2a)

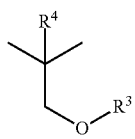
(2b)

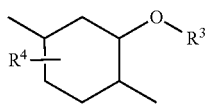
(2c)

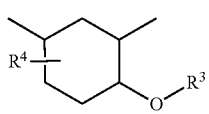
(2d)

in Formulae (2a) to (2d),
$R^3$ is a hydrogen atom or any one of the groups (A) to (E), and at least one of the plural $R^3$ present in Formula (2) is a photochromic group,
$R^4$ is a hydrogen atom or an alkyl group having 1 to 10 carbon atoms, and
$R^1$ and $R^2$ each is a divalent group represented by Formula (3):

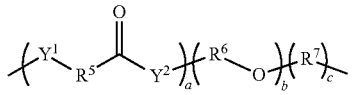
(3)

in Formula (3),
$R^5$ is an alkylene group having 1 to 30 carbon atoms, a cycloalkylene group having 3 to 30 carbon atoms, or an arylene group having 6 to 30 carbon atoms, $R^6$ is an alkylene group having 1 to 30 carbon atoms, a cycloalkylene group having 3 to 30 carbon atoms, an arylene group having 6 to 30 carbon atoms, or a silylene group having at least one groups as a substituent, an alkyl group having 1 to 30 carbon atoms, an alkoxy group having 1 to 30 carbon atoms, and an aryl group having 6 to 30 carbon atoms,
$R^7$ is an alkylene group having 1 to 30 carbon atoms, a cycloalkylene group having 3 to 30 carbon atoms, or an arylene group having 6 to 30 carbon atoms,
$Y^1$ and $Y^2$ each is a direct bond, an oxygen atom, a sulfur atom, CO, SO, or NH, and
a, b and c are integers from 0 to 100, provided that at least one of the a, the b and the c is other than zero.

4. The photochromic hydroxyurethane compound according to claim 1, wherein the at least one photochromic moiety is an indeno[2,1-f]naphtho[1,2-b]pyran skeleton.

5. The photochromic hydroxyurethane compound according to claim 1, wherein the polymerizable substituent is at least one group selected from the group consisting of an acrylic group, a methacryl group, an allyl group, a vinyl group, a 4-vinylphenyl group, an epoxy group, an episulfide group, a thiethanyl group, a carboxyl group, a hydroxyl group, a thiol group, an amino group, an isocyanate group, and a thiocyanate group.

6. The photochromic hydroxyurethane compound according to claim 5, wherein the polymerization reactive group is represented by Formula (6):

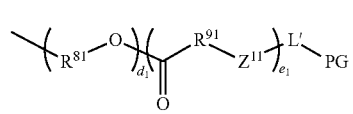
(6)

in the formula (6),
PG is a polymerizable substituent,
$d_1$ and $e_1$ are numbers from 0 to 50, respectively,
$R^{81}$ is an alkylene group having 1 to 30 carbon atoms,
$R^{91}$ is an alkylene group having 1 to 30 carbon atoms, or an alkylene group having 1 to 30 carbon atoms and having an ether bond,
$Z^{11}$ is an oxygen atom, a sulfur atom, or an NH group, and
L' is represented by Formula (7)

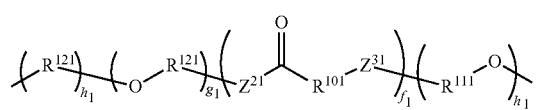
(7)

in the formula (7),
$R^{101}$ is a direct bonding hand, an alkylene group having 1 to 30 carbon atoms, a cycloalkylene group having 3 to 12 carbon atoms, or an arylene group having 6 to 12 carbon atoms,
$R^{111}$ is an alkylene group having 1 to 20 carbon atoms, a cycloalkylene group having 3 to 12 carbon atoms, an arylene group having 6 to 12 carbon atoms, or a dialkylsilylene group having an alkyl group having 1 to 20 carbon atoms,
$R^{121}$ is an alkylene group having 1 to 20 carbon atoms, a cycloalkylene group having 3 to 12 carbon atoms, or an arylene group having 6 to 12 carbon atoms, $Z^{21}$ and $Z^{31}$ each is a direct bond, O, CO, or NH, $f_1$ and $g_1$ are integers from 0 to 50, and, $h_1$ is an integer of 0 or 1.

7. The photochromic hydroxyurethane compound according to claim 1, wherein the photochromic group is represented by Formula (4):

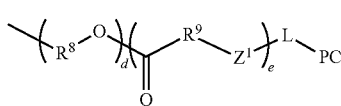

(4)

in the formula (4), d and e are integers from 0 to 50,

PC is a group having a photochromic moiety, $R^8$ is an alkylene group having 1 to 30 carbon atoms, $R^9$ is an alkylene group having 1 to 30 carbon atoms, or an alkylene group having 1 to 30 carbon atoms and having an ether bond, $Z^1$ is an oxygen atom, a sulfur atom, or NH, L is a divalent group having bonding hands one of which is bonded to the photochromic moiety, and represented by Formula (5):

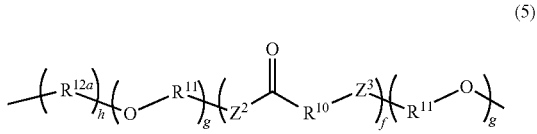

(5)

in the formula (5), $R^{10}$ is an alkylene group having 1 to 30 carbon atoms, a cycloalkylene group having 3 to 12 carbon atoms, or an arylene group having 6 to 12 carbon atoms, $R^{11}$ is an alkylene group having 1 to 20 carbon atoms, a cycloalkylene group having 3 to 12 carbon atoms, an arylene group having 6 to 12 carbon atoms, or a dialkylsilylene group having an alkyl group having 1 to 20 carbon atoms, $R^{12a}$ is an alkylene group having 1 to 20 carbon atoms, a cycloalkylene group having 3 to 12 carbon atoms, or an arylene group having 6 to 12 carbon atoms, $Z^2$ and $Z^3$ each is a direct bond, O, CO, or NH, f and g are integers from 0 to 50, and h is an integer of 0 or 1.

8. A curable composition comprising the photochromic hydroxyurethane compound according to claim 1 and other polymerizable compound.

9. The curable composition according to claim 8, wherein the other polymerizable compound has at least one polymerizable substituent selected from the group consisting of a carboxyl group, a hydroxyl group, a thiol group, an amino group, an isocyanate group, and a thiocyanate group.

10. The curable composition according to claim 8, wherein the other polymerizable compound has at least one radically polymerizable group as a polymerizable substituent, the radically polymerizable group selected from the group consisting of an acrylic group, a methacrylic group, an allyl group, a vinyl group, and a 4-vinylphenyl group.

11. The curable composition according to claim 8, wherein the other polymerizable compound has a compound having at least one polymerizable substituent selected from the group consisting of an epoxy group, an episulfide group, and a thietanyl group.

12. A photochromic cured body obtained by curing the curable composition according to claim 8.

13. A polymer molded article in which the photochromic hydroxyurethane according to claim 1 is dispersed.

14. An optical article coated with a polymer film in which the photochromic hydroxyurethane according to claim 1 is dispersed.

* * * * *